US010887916B2

(12) United States Patent
Kim et al.

(10) Patent No.: US 10,887,916 B2
(45) Date of Patent: *Jan. 5, 2021

(54) METHOD FOR UPDATING A NETWORK ALLOCATION VECTOR (NAV) IN WIRELESS LAN SYSTEM AND APPARATUS THEREFOR

(71) Applicant: LG ELECTRONICS INC., Seoul (KR)

(72) Inventors: Jeongki Kim, Seoul (KR); Kiseon Ryu, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/681,772

(22) Filed: Nov. 12, 2019

(65) Prior Publication Data

US 2020/0084803 A1 Mar. 12, 2020

Related U.S. Application Data

(63) Continuation of application No. 15/766,773, filed as application No. PCT/KR2016/012089 on Oct. 26, 2016, now Pat. No. 10,492,224.

(Continued)

(51) Int. Cl.
*H04W 74/08* (2009.01)
*H04L 1/00* (2006.01)
(Continued)

(52) U.S. Cl.
CPC ....... *H04W 74/0816* (2013.01); *H04L 1/0031* (2013.01); *H04W 8/26* (2013.01);
(Continued)

(58) Field of Classification Search
CPC .... H04L 1/0003; H04L 1/0031; H04W 12/06; H04W 48/16; H04W 84/12; H04W 8/26; H04W 74/002; H04W 74/08
See application file for complete search history.

(56) References Cited

U.S. PATENT DOCUMENTS 10,492,224 B2 11/2019 Kim et al.
2011/0194644 A1* 8/2011 Liu .................. H04L 5/0044
375/295

(Continued)

FOREIGN PATENT DOCUMENTS

EP 2757857 7/2014
KR 1020120135247 12/2012
(Continued)

OTHER PUBLICATIONS

U.S. Appl. No. 15/766,773, Notice of Allowance dated Jul. 9, 2019, 20 pages.

(Continued)

*Primary Examiner* — Mewale A Ambaye
(74) *Attorney, Agent, or Firm* — Lee, Hong, Degerman, Kang & Waimey

(57) ABSTRACT

A method for updating a network allocation vector (NAV) by a station (STA) in a wireless LAN system according to an embodiment of the present invention comprises the steps of: receiving a frame; and when the duration of the frame is greater than the value of an NAV of the STA, updating the NAV of the STA, wherein the duration is indicated by each of a signal (SIG) field of a physical layer and a header of an MAC layer in the frame, the duration indicated by the physical layer has a larger granularity of a time unit than that of the duration indicated by the MAC layer, and the STA updates the NAV through the duration having the larger (Continued)

granularity, indicated by the physical layer, when the duration indicated by the MAC layer cannot be obtained.

17 Claims, 20 Drawing Sheets

Related U.S. Application Data

(60) Provisional application No. 62/246,153, filed on Oct. 26, 2015, provisional application No. 62/299,020, filed on Feb. 24, 2016.

(51) Int. Cl.

| | |
|---|---|
| *H04W 8/26* | (2009.01) |
| *H04W 12/06* | (2009.01) |
| *H04W 74/04* | (2009.01) |
| *H04B 7/00* | (2006.01) |
| *H04W 84/12* | (2009.01) |
| *H04W 74/00* | (2009.01) |
| *H04W 48/16* | (2009.01) |

(52) U.S. Cl.
CPC .............. *H04W 12/06* (2013.01); *H04B 7/00* (2013.01); *H04L 1/0003* (2013.01); *H04W 48/16* (2013.01); *H04W 74/002* (2013.01); *H04W 74/04* (2013.01); *H04W 84/12* (2013.01)

(56) References Cited

U.S. PATENT DOCUMENTS

| | | | |
|---|---|---|---|
| 2012/0063446 A1 | 3/2012 | Chu et al. | |
| 2012/0327870 A1* | 12/2012 | Grandhi | H04W 28/26 370/329 |
| 2015/0071204 A1* | 3/2015 | Seok | H04W 74/08 370/329 |
| 2015/0124687 A1* | 5/2015 | Wentink | H04W 72/048 370/312 |
| 2018/0213558 A1* | 7/2018 | Kim | H04W 74/006 |
| 2018/0324859 A1 | 11/2018 | Kim et al. | |

FOREIGN PATENT DOCUMENTS

| | | |
|---|---|---|
| KR | 1020150013481 | 2/2015 |
| WO | 2015066177 | 5/2015 |

OTHER PUBLICATIONS

PCT International Application No. PCT/KR2016/012089, Written Opinion of the International Searching Authority dated Jan. 18, 2017, 13 pages.

Wang, S. et al., "Distributed MAC Protocol Supporting Physical-Layer Network Coding", IEEE Transactions on Mobile Computing, vol. 12, No. 5, May 2013, 14 pages.

* cited by examiner

FIG. 14

METHOD FOR UPDATING A NETWORK ALLOCATION VECTOR (NAV) IN WIRELESS LAN SYSTEM AND APPARATUS THEREFOR

CROSS-REFERENCE TO RELATED APPLICATIONS

This application is a continuation of U.S. patent application Ser. No. 15/766,773, filed on Apr. 6, 2018, now U.S. Pat. No. 10,492,224, which is the National Stage filing under 35 U.S.C. 371 of International Application No. PCT/KR2016/012089, filed on Oct. 26, 2016, which claims the benefit of U.S. Provisional Application No. 62/246,153, filed on Oct. 26, 2015, and 62/299,020, filed on Feb. 24, 2016, the contents of which are all hereby incorporated by reference herein in their entireties.

TECHNICAL FIELD

The present invention relates to a method and apparatus for updating a network allocation vector (NAV) in a wireless LAN system, and more particularly, to a method of updating NAV based on a received frame and apparatus therefor.

BACKGROUND ART

Standards for Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DISCLOSURE OF THE INVENTION

Technical Task

The technical task of the present invention is to provide a method and apparatus for an STA, which has received a frame indicating a duration on each of a physical layer and a MAC layer, to update NAV in a wireless LAN system.

The present invention is not limited to the above technical problems and other technical objects may be inferred from embodiments of the present invention.

Technical Solutions

In one technical aspect of the present invention, provided herein is a method of updating a network allocation vector (NAV) by a station (STA) in a wireless LAN system, including receiving a frame and updating the NAV of the STA if a duration of the frame is greater than an NAV value of the STA, wherein the duration is indicated by each of a signal (SIG) field of a physical layer of the frame and a header of a MAC layer, wherein the duration indicated on the physical layer has a greater granularity of a time unit than that of the duration indicated on the MAC layer, and wherein the STA performs the NAV update through a duration of the greater granularity indicated on the physical layer in case where the STA does not obtain the duration indicated on the MAC layer.

In another technical aspect of the present invention, provided herein is a station (STA), including a receiver receiving a frame and a processor updating the NAV of the STA if a duration of the frame is greater than an NAV value of the STA, wherein the duration is indicated by each of a signal (SIG) field of a physical layer of the frame and a header of a MAC layer, wherein the duration indicated on the physical layer has a greater granularity of a time unit than that of the duration indicated on the MAC layer, and wherein the processor performs the NAV update through a duration of the greater granularity indicated on the physical layer in case where the processor does not obtain the duration indicated on the MAC layer.

If the duration indicated on the MAC layer is obtainable, the STA may ignore the duration indicated on the physical layer and perform the NAV update through the duration indicated on the MAC layer.

The case where the STA does not obtain the duration indicated on the MAC layer may include one of a case that the STA fails to decode all MPDUs (MAC protocol data units) included in the frame, a case that the received frame is an uplink frame, a case that a header of the MAC layer is a short MAC header type, and a case that the STA makes transition to a doze mode for power saving after decoding the signal field.

In updating the NAV, the STA may select and update one of a plurality of NAVs maintained by the STA depending on whether the frame is received from a BSS (basic service set) where the STA belongs and the plurality of NAVs may include an intra-BSS NAV and an inter-BSS NAV.

If the frame is an OBSS (overlapping BSS) frame and a power of the frame is smaller than an OBSS PD (packet detection) level, an update of the inter-BSS NAV may not be performed even if the duration of the frame exceeds a value of the inter-BSS NAV.

The OBSS PD level may be provided for a spatial reuse and have a value greater than a CCA (clear channel assessment) threshold applied to an intra-BSS frame.

The NAV update is performed if the frame is not intended to the STA. The STA determines that the frame is not intended to the STA if an RA (recipient address) of the frame is not identical to a MAC address of the STA, if an AID (association identifier) of the STA is not included in the signal field, or if a BSS (basic service set) color included in the signal field is not identical to a color of a BSS where the STA belongs.

Advantageous Effects

According to one embodiment of the present invention, an STA having received a frame indicating a duration on each of a physical layer and a MAC layer updates NAV by preferentially considering duration configured with relatively fine granularity, whereby the NAV can be managed more accurately and efficiently.

Other technical effects in addition to the above-described effects may be inferred from embodiments of the present invention.

DESCRIPTION OF DRAWINGS

FIG. 14 illustrates another example of the HE PPDU.

BEST MODE FOR INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described before, the following description is given of a method and apparatus for increasing a spatial reuse rate in a Wireless Local Area Network (WLAN) system. To do so, a WLAN system to which the present invention is applied will first be described in detail.

Figure 1:
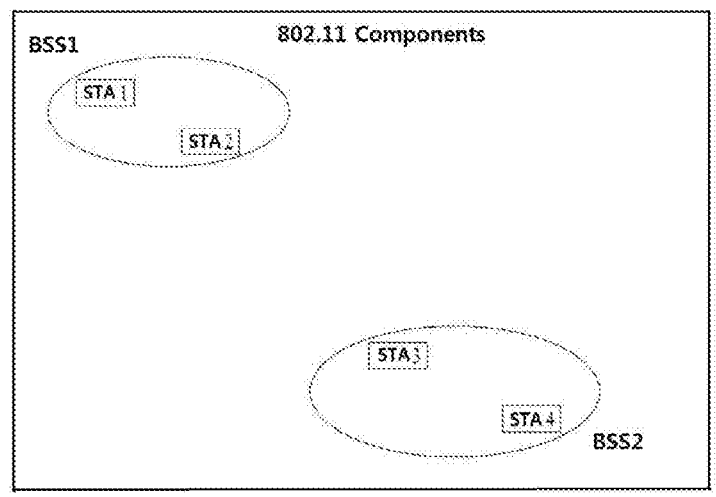
FIG. 1 illustrates an example of a configuration of a wireless LAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
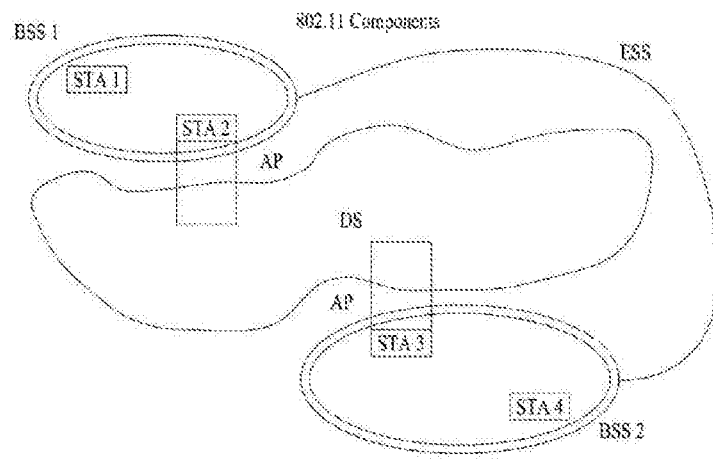
FIG. 2 illustrates another example of a configuration of a wireless LAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Layer Architecture

An operation of a STA in a WLAN system may be described from the perspective of a layer architecture. A processor may implement the layer architecture in terms of device configuration. The STA may have a plurality of layers. For example, the 802.11 standards mainly deal with a MAC sublayer and a PHY layer on a Data Link Layer (DLL). The PHY layer may include a Physical Layer Convergence Protocol (PLCP) entity, a Physical Medium Dependent (PMD) entity, and the like. Each of the MAC sublayer and the PHY layer conceptually includes management entities called MAC sublayer Management Entity (MLME) and Physical Layer Management Entity (PLME). These entities provide layer management service interfaces through which a layer management function is executed.

To provide a correct MAC operation, a Station Management Entity (SME) resides in each STA. The SME is a layer independent entity which may be perceived as being present in a separate management plane or as being off to the side. While specific functions of the SME are not described in detail herein, the SME may be responsible for collecting layer-dependent states from various Layer Management Entities (LMEs) and setting layer-specific parameters to similar values. The SME may execute these functions and implement a standard management protocol on behalf of general system management entities.

The above-described entities interact with one another in various manners. For example, the entities may interact with one another by exchanging GET/SET primitives between them. A primitive refers to a set of elements or parameters related to a specific purpose. An XX-GET.request primitive is used to request a predetermined MIB attribute value (management information-based attribute information). An XX-GET.confirm primitive is used to return an appropriate MIB attribute information value when the Status field indicates "Success" and to return an error indication in the Status field when the Status field does not indicate "Success". An XX-SET.request primitive is used to request setting of an indicated MIB attribute to a predetermined value. When the MIB attribute indicates a specific operation, the MIB attribute requests the specific operation to be performed. An XX-SET.confirm primitive is used to confirm that the indicated MIB attribute has been set to a requested value when the Status field indicates "Success" and to return an error condition in the Status field when the Status field does not indicate "Success". When the MIB attribute indicates a specific operation, it confirms that the operation has been performed.

Also, the MLME and the SME may exchange various MLME_GET/SET primitives through an MLME Service Access Point (MLME_SAP). In addition, various PLME_GET/SET primitives may be exchanged between the PLME and the SME through a PLME_SAP, and exchanged between the MLME and the PLME through an MLME-PLME_SAP.

Link Setup Process

Figure 3:
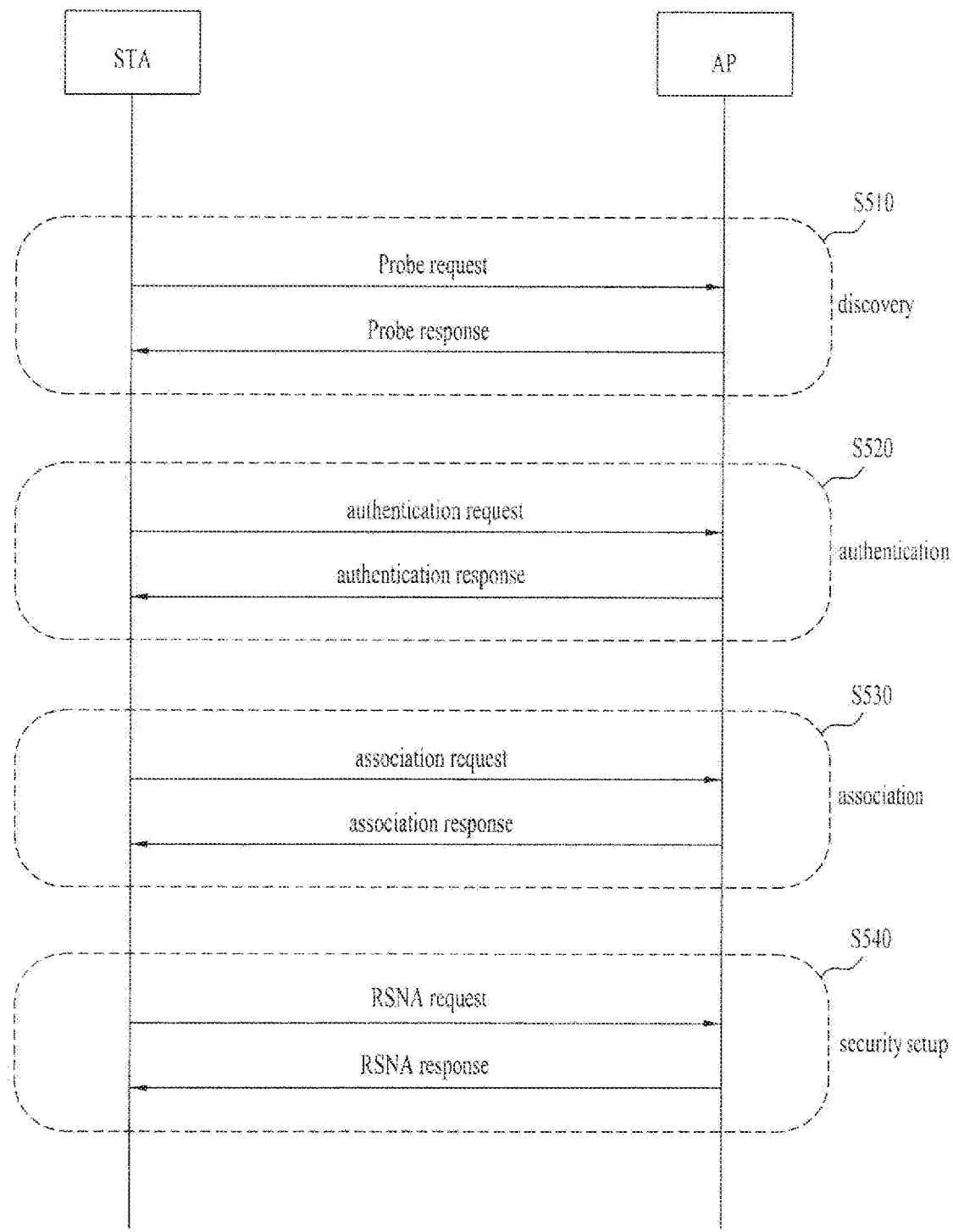
FIG. 3 illustrates a general link setup procedure.

FIG. 3 is a flowchart explaining a general link setup process according to an exemplary embodiment of the present invention.

In order to allow a STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 3.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 3 is a flowchart illustrating a network discovery action including an active scanning process. In the case of the active scanning, a STA configured to perform scanning transmits a probe request frame and waits for a response to the probe request frame, such that the STA can move between channels and at the same time can determine which Access Point (AP) is present in a peripheral region. A responder transmits a probe response frame, acting as a response to the probe request frame, to the STA having transmitted the probe request frame. In this case, the responder may be a STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 3, the scanning action may also be carried out using passive scanning A STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a Quality of Service (QoS) map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an Extensible Authentication Protocol over LAN (EAPOL) frame. In addition, the security setup process may also be carried out according to other security schemes not defined in IEEE 802.11 standards.

Medium Access Mechanism

In the IEEE 802.11-based WLAN system, a basic access mechanism of Medium Access Control (MAC) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 4:
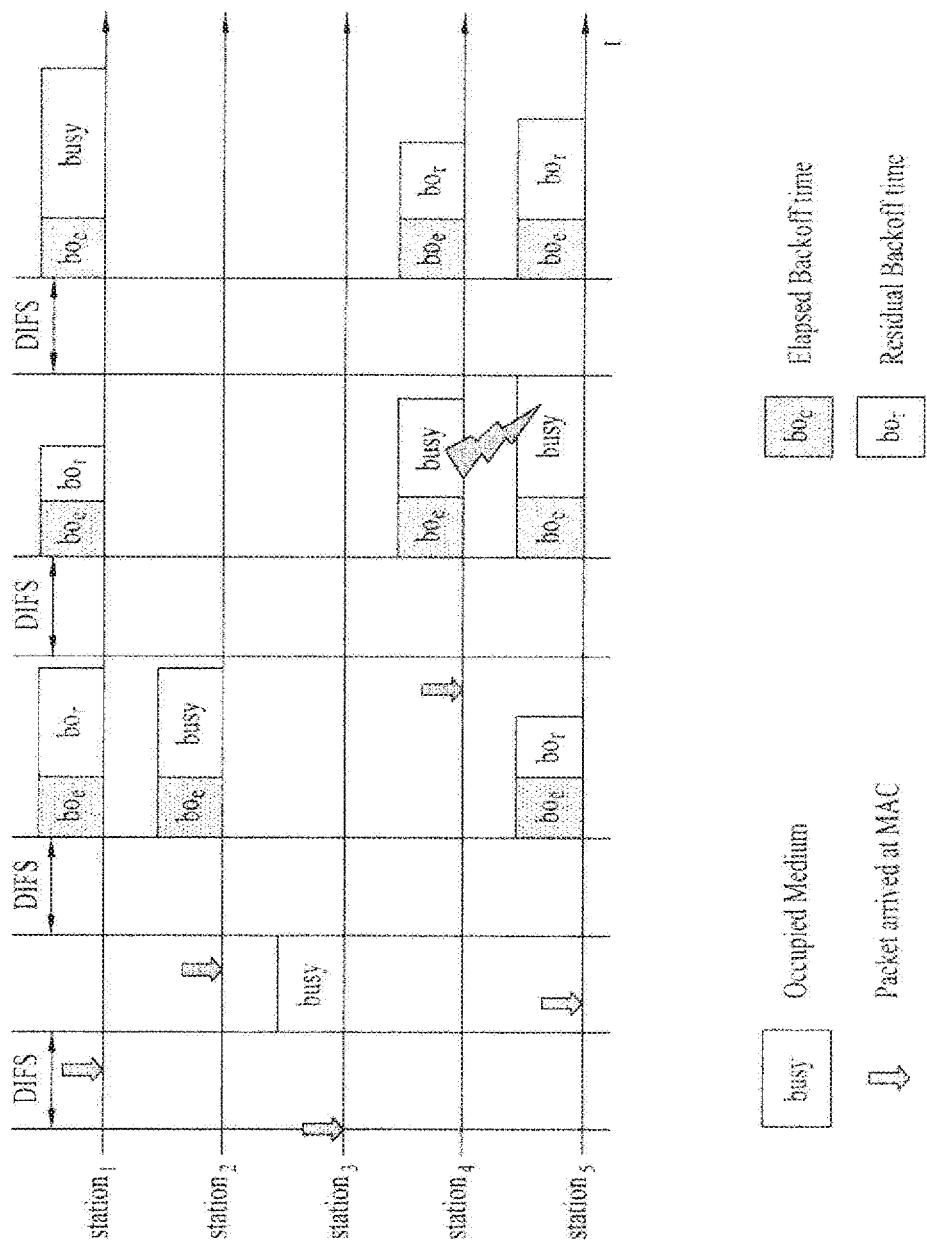
FIG. 4 illustrates a backoff procedure.

FIG. 4 is a conceptual diagram illustrating a backoff process.

Operations based on a random backoff period will hereinafter be described with reference to FIG. 4. If the occupy- or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count has a value of a Packet Number (PN), and may be set to one of 0 to CW values. In this case, CW refers to a Contention Window parameter value. Although an initial value of the CW parameter is denoted by CW min, the initial value may be doubled in case of a transmission failure (for example, in the case in which ACK of the transmission frame is not received). If the CW parameter value is denoted by CW max, CW max is maintained until data transmission is successful, and at the same time it is possible to attempt to start data transmission. If data transmission was successful, the CW parameter value is reset to CW min Preferably, CW, CW min, and CW max are set to $2^n-1$ (where n= 0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 4, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 4 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 4 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. A STA having received the NAV value may prohibit medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present invention.

Figure 5:
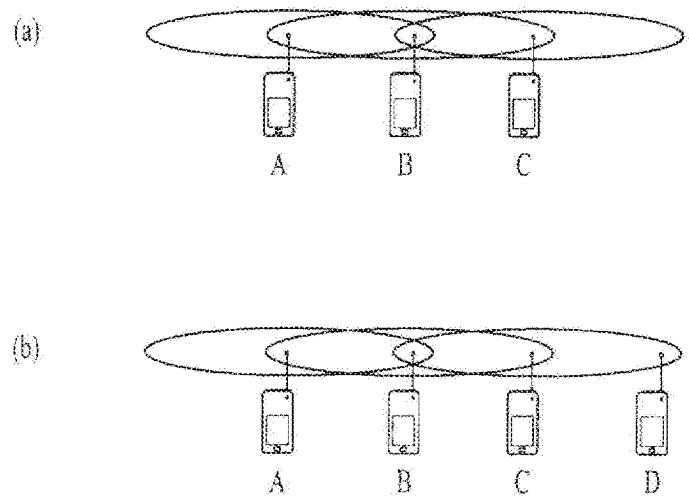
FIG. 5 is an explanatory diagram of a hidden node and an exposed node.

FIG. 5 is a conceptual diagram illustrating a hidden node and an exposed node.

FIG. 5(a) exemplarily shows the hidden node. In FIG. 5(a), STA A communicates with STA B, and STA C has information to be transmitted. In FIG. 5(a), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 5(b) exemplarily shows an exposed node. In FIG. 5(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 6:
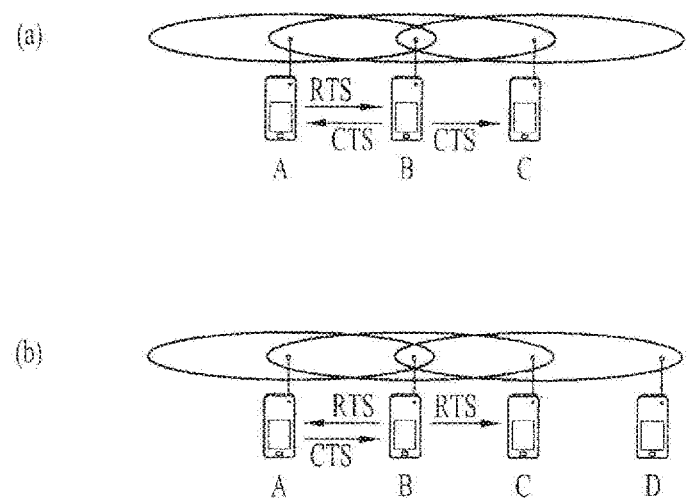
FIG. 6 is an explanatory diagram of RTS and CTS.

FIG. 6 is a conceptual diagram illustrating Request To Send (RTS) and Clear To Send (CTS).

In order to efficiently utilize the collision avoidance mechanism under the above-mentioned situation of FIG. 5, it is possible to use a short signaling packet such as RTS and CTS. RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 6(a) exemplarily shows the method for solving problems of the hidden node. In FIG. 6(a), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 6(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Power Management

As described above, the WLAN system has to perform channel sensing before STA performs data transmission/reception. The operation of always sensing the channel causes persistent power consumption of the STA. There is not much difference in power consumption between the Reception (Rx) state and the Transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a Power Management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

The AP may transmit a beacon frame to STAs in a BSS at predetermined intervals. The beacon frame may include a traffic indication map (TIM) information element. The TIM information element may include information indicating that the AP has buffered traffic for STAs associated therewith and will transmit frames. TIM elements include a TIM used to indicate a unicast frame and a delivery traffic indication map (DTIM) used to indicate a multicast or broadcast frame.

Figure 7:
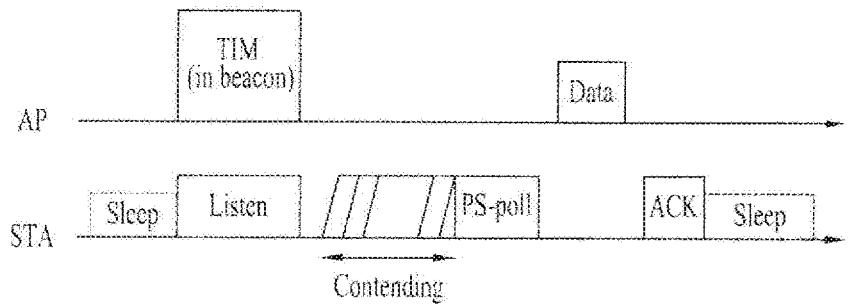
FIGS. 7 to 9 are explanatory diagrams of operation of an STA that has received TIM.
Figure 8:
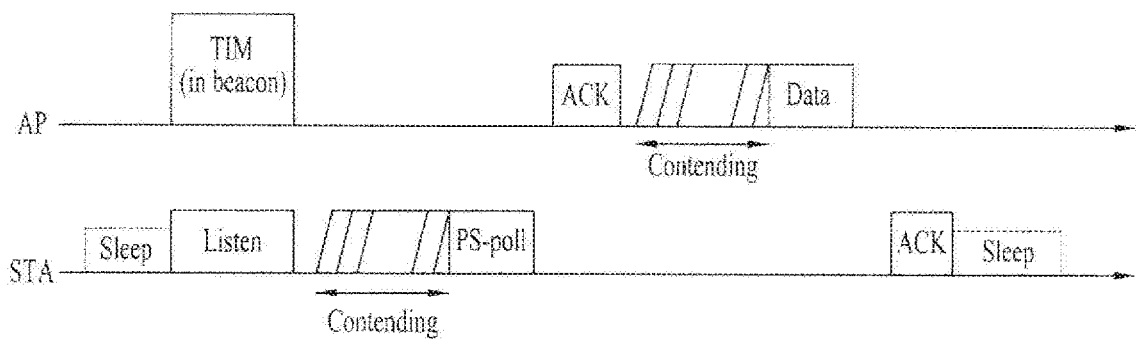
Figure 9:
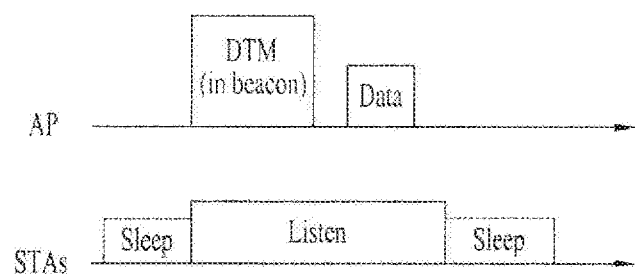

FIGS. 7 to 9 are conceptual diagrams illustrating detailed operations of the STA having received a Traffic Indication Map (TIM).

Referring to FIG. 7, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 7, the AP may operate according to the immediate response scheme, such that the AP receives the PS-Poll frame from the STA and transmits the data frame after lapse of a predetermined time [for example, Short Inter-Frame Space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be described with reference to FIG. 8.

The STA operations of FIG. 8 in which the STA is switched from the sleep state to the awake state, receives a TIM from the AP, and transmits the PS-Poll frame to the AP through contention are identical to those of FIG. 7. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contending. STA may transmit the ACK frame indicating successful reception of a data frame to the AP, and may be shifted to the sleep state.

FIG. 9 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintains the awake state after reception of the beacon frame including the DTIM, the STAs may receive data, and then switch to the sleep state after completion of data reception.

Frame Structure

Figure 10:
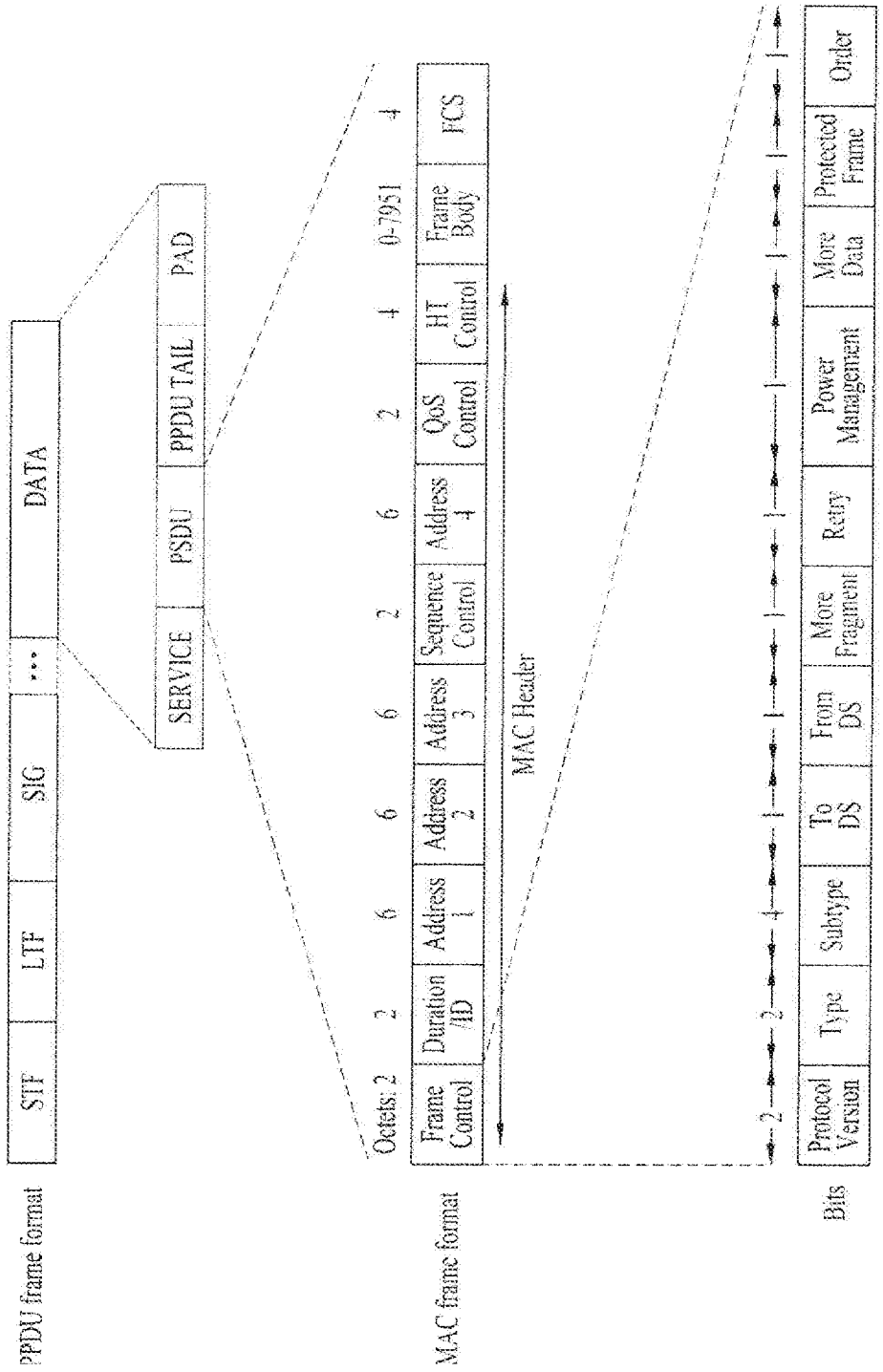
FIG. 10 is an explanatory diagram of an exemplary frame structure used in an IEEE 802.11 system.

FIG. 10 is an explanatory diagram of an exemplary frame structure used in an IEEE 802.11 system.

A PPDU (Physical Layer Protocol Data Unit) frame format may include an STF (Short Training Field), an LTF (Long Training Field), a SIG (SIGNAL) field and a data field. The most basic (e.g., non-HT (High Throughput)) PPDU frame format may include only an L-STF (Legacy-STF), an L-LTF (Legacy-LTF), a SIG field and a data field.

The STF is a signal for signal detection, AGC (Automatic Gain Control), diversity selection, accurate time synchronization, etc., and the LTF is a signal for channel estimation, frequency error estimation, etc. The STF and LTF may be collectively called a PLCP preamble. The PLCP preamble may be regarded as a signal for OFDM physical layer synchronization and channel estimation.

The SIG field may include a RATE field and a LENGTH field. The RATE field may include information about modulation and coding rates of data. The LENGTH field may include information about the length of data. In addition, the SIG field may include a parity bit, a SIG TAIL bit, etc.

The data field may include a SERVICE field, a PSDU (Physical layer Service Data Unit) and a PPDU TAIL bit. The data field may also include padding bits as necessary. Some bits of the SERVICE field may be used for synchronization of a descrambler at a receiving end. The PSDU corresponds to an MPDU (MAC Protocol Data Unit) defined in the MAC layer and may include data generated/used in a higher layer. The PPDU TAIL bit may be used to return an encoder to state 0. The padding bits may be used to adjust the length of the data field to a predetermined unit.

The MPDU is defined depending on various MAC frame formats, and a basic MAC frame includes a MAC header, a frame body and an FCS (Frame Check Sequence). The MAC frame may be composed of the MPDU and transmitted/received through PSDU of a data part of the PPDU frame format.

The MAC header includes a frame control field, a duration/ID field, an address field, etc. The frame control field may include control information necessary for frame transmission/reception. The duration/ID field may be set to a time to transmit a relevant a relevant frame.

The duration/ID field included in the MAC header may be set to a 16-bit length (e.g., B0 to B15). Content included in the duration/ID field may depend on frame type and sub-type, whether transmission is performed for a CFP (contention free period), QoS capability of a transmission STA and the like. (i) In a control frame corresponding to a sub-type of PS-Poll, the duration/ID field may include the AID of the transmission STA (e.g., through 14 LSBs) and 2 MSBs may be set to 1. (ii) In frames transmitted by a PC (point coordinator) or a non-QoS STA for a CFP, the duration/ID field may be set to a fixed value (e.g., 32768). (iii) In other frames transmitted by a non-QoS STA or control frames transmitted by a QoS STA, the duration/ID field may include a duration value defined per frame type. In a data frame or a management frame transmitted by a QoS STA, the duration/ID field may include a duration value defined per frame type. For example, B15=0 of the duration/ID field indicates that the duration/ID field is used to indicate a TXOP duration, and B0 to B14 may be used to indicate an actual TXOP duration. The actual TXOP duration indicated by B0 to B14 may be one of 0 to 32767 and the unit thereof may be microseconds (μs). However, when the duration/ID field indicates a fixed TXOP duration value (e.g., 32768), B15 can be set to 1 and B0 to B14 can be set to 0. When B14=1 and B15=1, the duration/ID field is used to indicate an AID, and B0 to B13 indicate one AID of 1 to 2007. Refer to the IEEE 802.11 standard document for details of Sequence Control, QoS Control, and HT Control subfields of the MAC header.

The frame control field of the MAC header may include Protocol Version, Type, Subtype, To DS, From DS, More Fragment, Retry, Power Management, More Data, Protected Frame and Order subfields. Refer to the IEEE 802.11 standard document for contents of the subfields of the frame control field.

Figure 11:
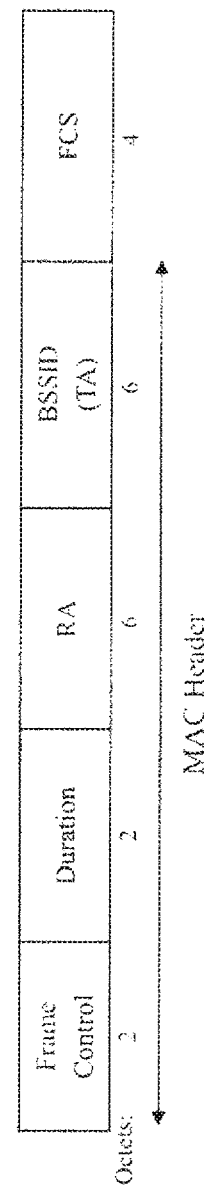
FIG. 11 illustrates a contention free (CF)-END frame.
Figure 12:
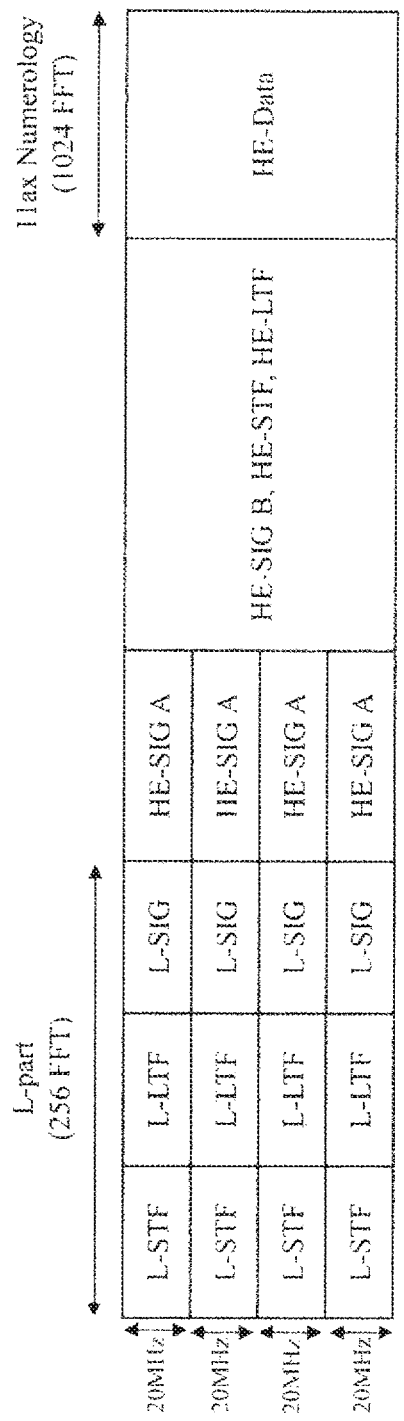
FIG. 12 illustrates an example of an HE PPDU.

FIG. 11 illustrates a CF (contention free)-END frame.

It is assumed that the CF-END frame is transmitted by a non-DMG (directional multi-gigabit, 11ad) STA for convenience of description. The CF-END frame may be transmitted to truncate a TXOP duration. Accordingly, a duration field is set to 0 in the CF-END frame. An RA (Receiver Address) field may be set to a broadcast group address. A BSSID field may be set to an STA address included in a relevant AP. However, in the case of a CF-END frame in a non-HT or non-HT duplicate format, which is transmitted from a VHT STA to a VHT AP, an Individual/Group bit of the BSSID field may be set to 1.

Example of HE PPDU Structure

Described in the following are examples of HE PPDU (high efficiency physical layer protocol data unit) format in a wireless LAN system supportive of 11ax.

FIGS. 12 to 16 show examples of HE PPDU.

HE-SIG A (or HE-SIG1) field is located next to L-Part (e.g., L-STF, L-LTF, L-SIG) and duplicated by 20-MHz unit like the L-Part. For the HE-SIG A field, DFT period of 3.2 us and subcarrier spacing of 312.5 kHz are usable. For example, assuming that MCS 0 is used, HE-SIG A field can be configured with 2 symbols.

HE-SIG B may be omitted from SU PPDU and UL trigger based PPDU (e.g., UL PPDU transmitted based on a trigger frame), whereas HE-SIG A can be included in all HE PPDUs.

HE-SIG A includes common control information (e.g., BW, GI length, BSS colors, CRC, Tail, etc.) on STAs. HE-SIG A field includes information for analyzing HE PPDU and thus information included in the HE-SIG A field may vary depending on the format of the HE PPDU (e.g., SU PPDU, MU PPDU, trigger based PPDU, etc.). For example, (i) in HE SU PPDU format, HE-SIG A field may include at least one of a DL/UL indicator, an HE PPDU format indicator, a BSS color, a TXOP duration, a BW (bandwidth), an MCS, CP+LTF length, coding information, #of streams, STBC (e.g., whether STBC is used), Tx beamforming (TxBF) information, CRC, and Tail. In case of HE SU PPDU format, HE-SIG B field can be omitted. (ii) In HE MU PPDU format, HE-SIG A field may include at least one of a DL/UL indicator, a BSS color, a TXOP duration, a BW (bandwidth), MCS information of SIG B field, #of symbols of SIG B field, #of HE LTF symbols, an indicator indicating whether full-band MU-MIMO is used, CP+LTF length, Tx beamforming (TxBF) information, CRC and Tail. (iii) In HE trigger based PPDU format, HE-SIG A field may include at least one of a format indicator (e.g., indicator indicating SU PPDU or trigger based PUDU), a BSS color, a TXOP duration, a BW, CRC and Tail.

In HE-SIG A, user allocation information, e.g., at least one of STA ID (e.g., PAID, GID, etc.), allocated resource information, and #of streams (Nsts) may be included as well as the aforementioned common control information.

BSS color information included in HE-SIG A field is the information for identifying BSS and has a length smaller than that of BSSID. For example, BSS color information can have 6-bit length, whereas BSSID has a 48-bit length. STA can determine whether it is an intra-BSS frame using BSS color information. Namely, the STA can identify intra BSS PPDU and inter BSS PPDU through BSS color information despite decoding HE-SIG A field only without decoding the whole HE PPDU.

Figure 13:
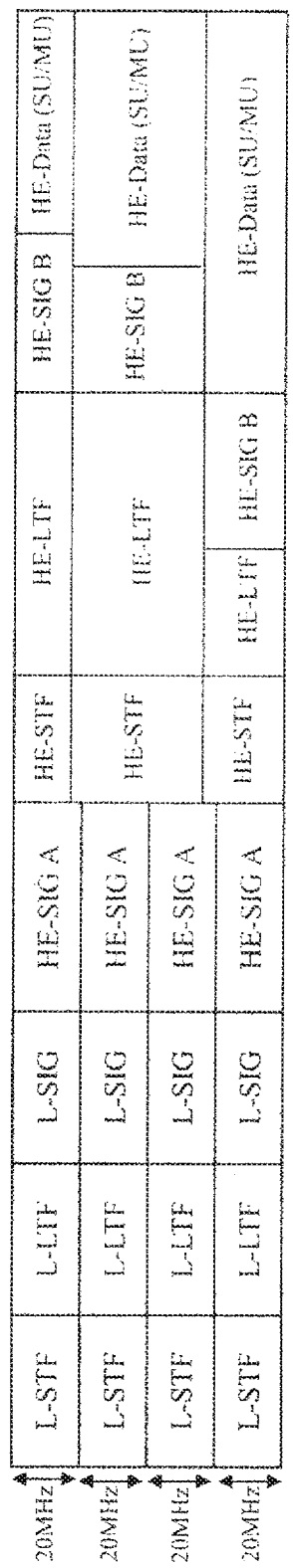
FIG. 13 illustrates another example of the HE PPDU.

Referring to FIG. 13, the HE-SIG B (or HE-SIG2) may be transmitted for each OFDMA allocation. In the case of MU-MIMO, the HE-SIG B is identified by an STA through SDM. The HE-SIG B may include additional user allocation information, for example, an MCS, coding information, STBC (Space Time Block Code) information and transmission beamforming (TXBF) information.

Figure 14:
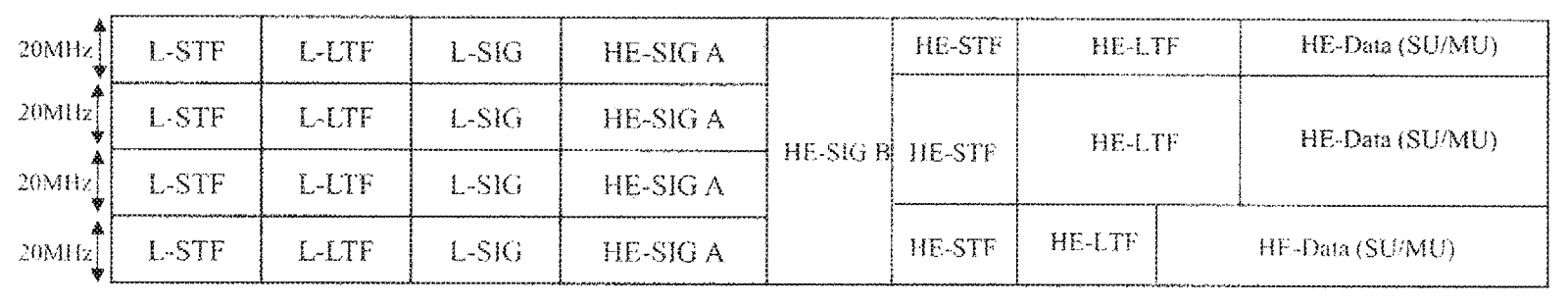

FIG. 14 illustrates another example of the HE PPDU. The HE-SIG B is transmitted following the HE-SIG A. The HE-SIG B may be transmitted through the full band on the basis of numerology of the HE-SIG A. The HE-SIG B may include user allocation information, for example, STA AID, resource allocation information (e.g., allocation size), MCS, the number of streams (Nsts), coding, STBC and transmission beamforming (TXBF) information.

Figure 15:
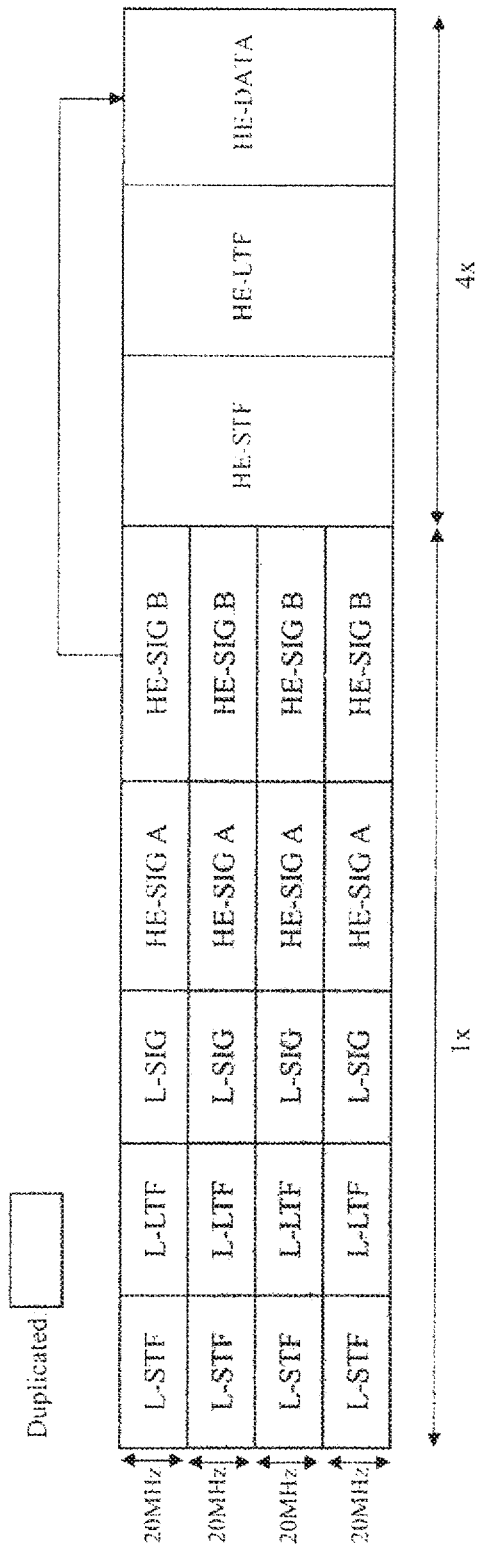
FIG. 15 illustrates another example of the HE PPDU.

FIG. 15 illustrates another example of the HE PPDU. The HE-SIG B may be duplicated per predetermined unit channel Referring to FIG. 15, the HE-SIG B may be duplicated per 20 MHz. For example, the HE-SIG B can be transmitted in such a manner that the same information is duplicated per 20 MHz in 80 MHz bandwidth.

An STA/AP which has received the HE-SIG B duplicated every 20 MHz may accumulate the received HE-SIG B per 20 MHz channel to improve reliability of HE-SIG B reception.

Since the same signal (e.g., HE-SIG B) is duplicated and transmitted per channel, the gain of accumulated signals is proportional to the number of channels over which the signal is duplicated and transmitted to improve reception performance. In theory, a duplicated and transmitted signal can have a gain corresponding to 3 dB×(the number of channels) compared to the signal before duplication. Accordingly, the duplicated and transmitted HE-SIG B may be transmitted with an increased MCS level depending on the number of channels through which the HE-SIG B is duplicated and transmitted. For example, if MCS0 is used for the HE-SIG B transmitted without being duplicated, MCS1 can be used for the HE-SIG B duplicated and transmitted. Since the HE-SIG B can be transmitted with a higher MCS level as the number of channels for duplication increases, HE-SIG B overhead per unit channel can be reduced.

Figure 16:
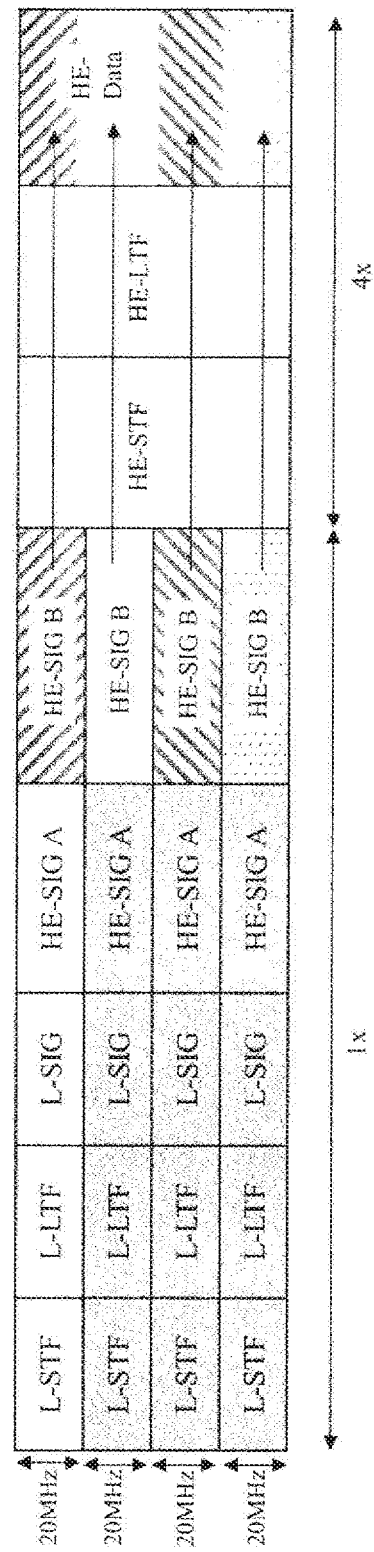
FIG. 16 illustrates another example of the HE PPDU.

FIG. 16 illustrates another example of the HE PPDU. Referring to FIG. 16, the HE-SIG B may include independent information per 20 MHz channel. The HE-SIG B may be transmitted in a 1× symbol structure like the Legacy part (e.g., L-STF, L-LTF, L-SIG) and HE-SIG A. Meanwhile, a length of "L-STF+L-LTF+L-SIG+HE-SIGA+HE-SIGB" needs to be identical in all channels in a wide bandwidth. The HE-SIG B transmitted per 20 MHz channel may include allocation information about the corresponding band, for example, allocation information per user using the corresponding band, user ID, etc. However, the information of the HE-SIG B may vary between bands because the respective bands support different numbers of users and use different resource block configurations. Accordingly, the length of the HE-SIG B may be different for respective channels.

Figure 17:
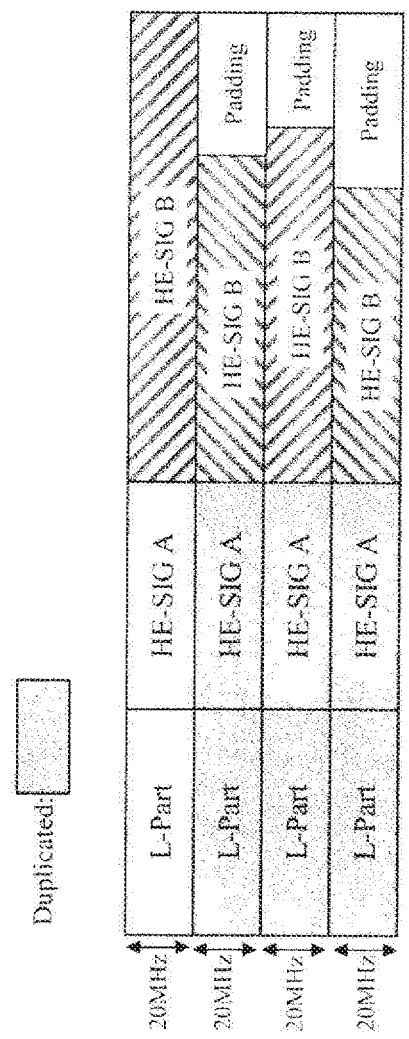
FIGS. 17 and 18 illustrating an HE-SIG B padding method.
Figure 18:
Figure 18:
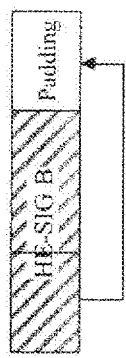

FIG. 17 illustrates an HE-SIG B padding method by which lengths before HE-STF (e.g., lengths to the HE-SIG B) become identical for respective channels. For example, the HE-SIG B may be duplicated by a padding length to align HE-SIG B lengths. As illustrated in FIG. 18, the HE-SIG B corresponding to a necessary padding length may be padded to the HE-SIG B from the start (or end) of the HE-SIG B.

According to an example, one HE-SIG B field can be transmitted when the bandwidth does not exceed 20 MHz. When the bandwidth exceeds 20 MHz, 20 MHz channels may respectively transmit one of a first type HE-SIG B (referred to hereinafter as HE-SIG B [1]) and a second type HE-SIG B (referred to hereinafter as HE-SIG B [2]). For example, HE-SIG B [1] and HE-SIG B [2] may be alternately transmitted. An odd-numbered 20 MHz channel may deliver HE-SIG B [1] and an even-numbered 20 MHz channel may deliver HE-SIG B [2]. More specifically, in the case of a 40 MHz bandwidth, HE-SIG B [1] is transmitted over the first 20 MHz channel and HE-SIG B [2] is transmitted over the second 20 MHz channel. In the case of an 80 MHz bandwidth, HE-SIG B [1] is transmitted over the first 20 MHz channel, HE-SIG B [2] is transmitted over the second 20 MHz channel, the same HE-SIG B [1] is duplicated and transmitted over the third 20 MHz channel and the same HE-SIG B [2] is duplicated and transmitted over the fourth 20 MHz channel. The HE-SIG B is transmitted in a similar manner in the case of a 160 MHz bandwidth.

As described above, the HE-SIG B can be duplicated and transmitted as the bandwidth increases. Here, a duplicated HE-SIG B may be frequency-hopped by 20 MHz from a 20 MHz channel over which an HE-SIG B of the same type is transmitted and transmitted.

HE-SIG B [1] and HE-SIG B [2] may have different content. However, HE-SIG-Bs [1] have the same content. Similarly, HE-SIG Bs [2] have the same content.

According to an embodiment, HE-SIG B [1] may be configured to include resource allocation information about only odd-numbered 20 MHz channels and HE-SIG B [2] may be configured to include resource allocation information about only even-numbered 20 MHz channels. According to another embodiment of the present invention, HE-SIG B [1] may include resource allocation information about at least part of even-numbered 20 MHz channels or HE-SIG B [2] may include resource allocation information about at least part of odd-numbered 20 MHz channels.

The HE-SIG B may include a common field and a user-specific field. The common field may precede the user-specific field. The common field and the user-specific field may be distinguished in a unit of bit(s) instead of a unit of OFDM symbol(s).

The common field of the HE-SIG B includes information for all STAs designated to receive PPDUs in a corresponding bandwidth. The common field may include resource unit (RU) allocation information. All the HE-SIG Bs [1] may have the same content and All the HE-SIG Bs [2] may have the same content. For example, when four 20 MHz channels constituting 80 MHz are classified as [LL, LR, RL, RR], the common field of HE-SIG B [1] may include a common block for LL and RL and the common field of HE-SIG B [2] may include a common block for LR and RR.

The user-specific field of the HE-SIG B may include a plurality of user fields. Each user field may include information specific to an individual STA designated to receive PPDUs. For example, the user field may include at least one of an STA ID, MCS per STA, the number of streams (Nsts), coding (e.g., indication of use of LDPC), DCM indicator and transmission beamforming information. However, the information of the user field is not limited thereto.

UL MU Transmission

Figure 19:
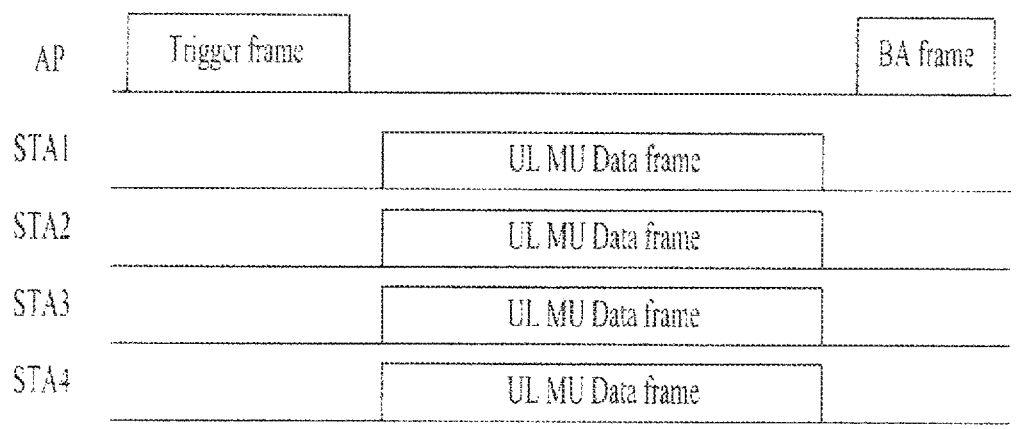
FIG. 19 is an explanatory diagram of uplink multi-user transmission according to an embodiment of the present invention.

FIG. 19 is an explanatory diagram of an uplink multi-user transmission situation according to an embodiment of the present invention.

As described above, an 802.11ax system may employ UL MU transmission. UL MU transmission may be started when an AP transmits a trigger frame to a plurality of STAs (e.g., STA1 to STA4), as illustrated in FIG. 19. The trigger frame may include UL MU allocation information. The UL MU allocation information may include at least one of resource position and size, STA IDs or reception STA addresses, MCS and MU type (MIMO, OFDMA, etc.). Specifically, the trigger frame may include at least one of (i) a UL MU frame duration, (ii) the number of allocations (N) and (iii) information per allocation. The information per allocation may include information per user (Per user Info). The information per allocation may include at least one of an AID (AIDs corresponding to the number of STAs are added in the case of MU), power adjustment information, resource (or tone) allocation information (e.g., bitmap), MCS, the number of streams (Nsts), STBC, coding and transmission beamforming information.

As illustrated in FIG. 19, the AP may acquire TXOP to transmit the trigger frame through a contention procedure to access media. Accordingly, the STAs may transmit UL data frames in a format indicated by the AP after SIFS of the trigger frame. It is assumed that the AP according to an embodiment of the present invention sends an acknowledgement response to the UL data frames through a block ACK (BA) frame.

Figure 20:
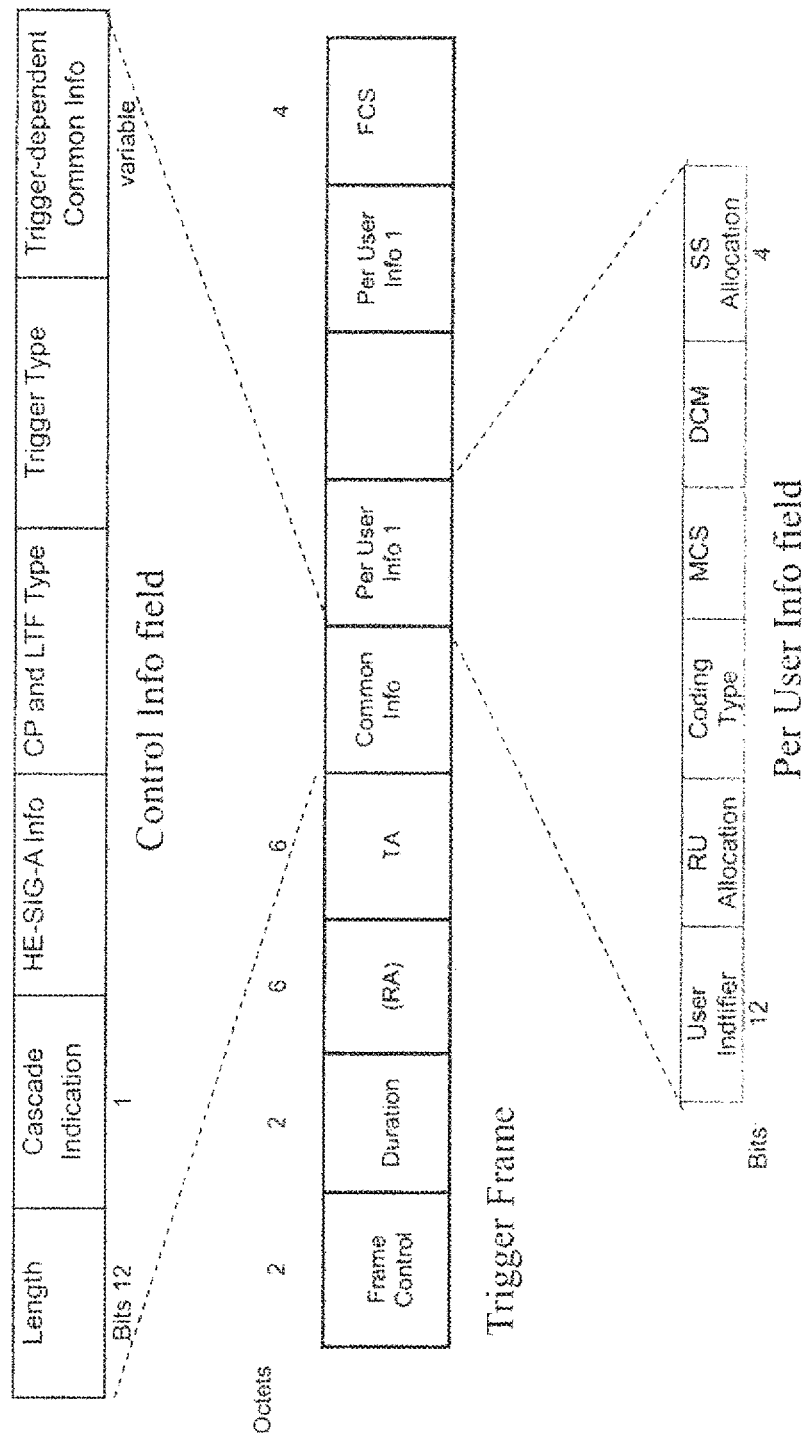
FIG. 20 illustrates a trigger frame format according to an embodiment of the present invention.

FIG. 20 illustrates a trigger frame format according to an embodiment.

Referring to FIG. 20, the trigger frame may include at least one of a frame control field, a duration field, an RA (recipient STA address) field, a TA (transmitting STA address) field, a common information field, one or more Per User Info fields and FCS (Frame Check Sum). The RA field indicates the address or ID of a recipient STA and may be omitted according to embodiments. The TA field indicates the address of a transmitting STA.

The common information field may include at least one of a length subfield, a cascade indication subfield, an HE-SIG A information subfield, a CP/LTF type subfield, a trigger type subfield and a trigger-dependent common information subfield. The length subfield indicates the L-SIG length of a UL MU PPDU. The cascade indication indicates whether there is transmission of a subsequent trigger frame following the current trigger frame. The HE-SIG A information subfield indicates content to be included in the HE-SIG A of the UL MU PPDU. The CP/LTF type subfield indicates a CP and HE LTF type included in the UL MU PPDU. The trigger type subfield indicates the type of the trigger frame. The trigger frame may include common information specific to the type and information per user (Per User Info) specific to the type. For example, the trigger type may be set to one of a basic trigger type (e.g., type 0), beamforming report poll trigger type (e.g., type 1), MU-BAR (Multi-user Block Ack Request) type (e.g., type 2) and MU-RTS (multi-user ready to send) type (e.g., type 3). However the trigger type is not limited thereto. When the trigger type is MU-BAR, the trigger-dependent common information subfield may include a GCR (Groupcast with Retries) indicator and a GCR address.

The Per User Info field may include at least one of a user ID subfield, an RU allocation subfield, a coding type subfield, an MCS subfield, a DCM (dual sub-carrier modulation) subfield, an SS (spatial stream) allocation subfield and a trigger dependent Per User Info subfield. The user ID subfield indicates the AID of an STA which will use a corresponding resource unit to transmit MPDU of the UL MU PPDU. The RU allocation subfield indicates a resource unit used for the STA to transmit the UL MU PPDU. The coding type subfield indicates the coding type of the UL MU PPDU transmitted by the STA. The MCS subfield indicates the MCS of the UL MU PPDU transmitted by the STA. The DCM subfield indicates information about double carrier modulation of the UL MU PPDU transmitted by the STA. The SS allocation subfield indicates information about spatial streams of the UL MU PPDU transmitted by the STA. In the case of MU-BAR trigger type, the trigger-dependent Per User Info subfield may include BAR control and BAR information.

NAV (Network Allocation Vector)

A NAV may be understood as a timer for protecting TXOP of a transmitting STA (e.g., TXOP holder). An STA may not perform channel access during a period in which a NAV configured in the STA is valid so as to protect TXOP of other STAs.

A legacy STA which does not support 11ax (e.g., non-HE STA) supports one NAV. An STA which has received a valid frame can update the NAV through the duration field of the PSDU (e.g., the duration field of the MAC header). When the RA field of the received frame corresponds to the MAC address of the STA, however, the STA does not update the NAV. When a duration indicated by the duration field of the received frame is greater than the current NAV value of the STA, the STA updates the NAV through the duration of the received frame.

Figure 21:
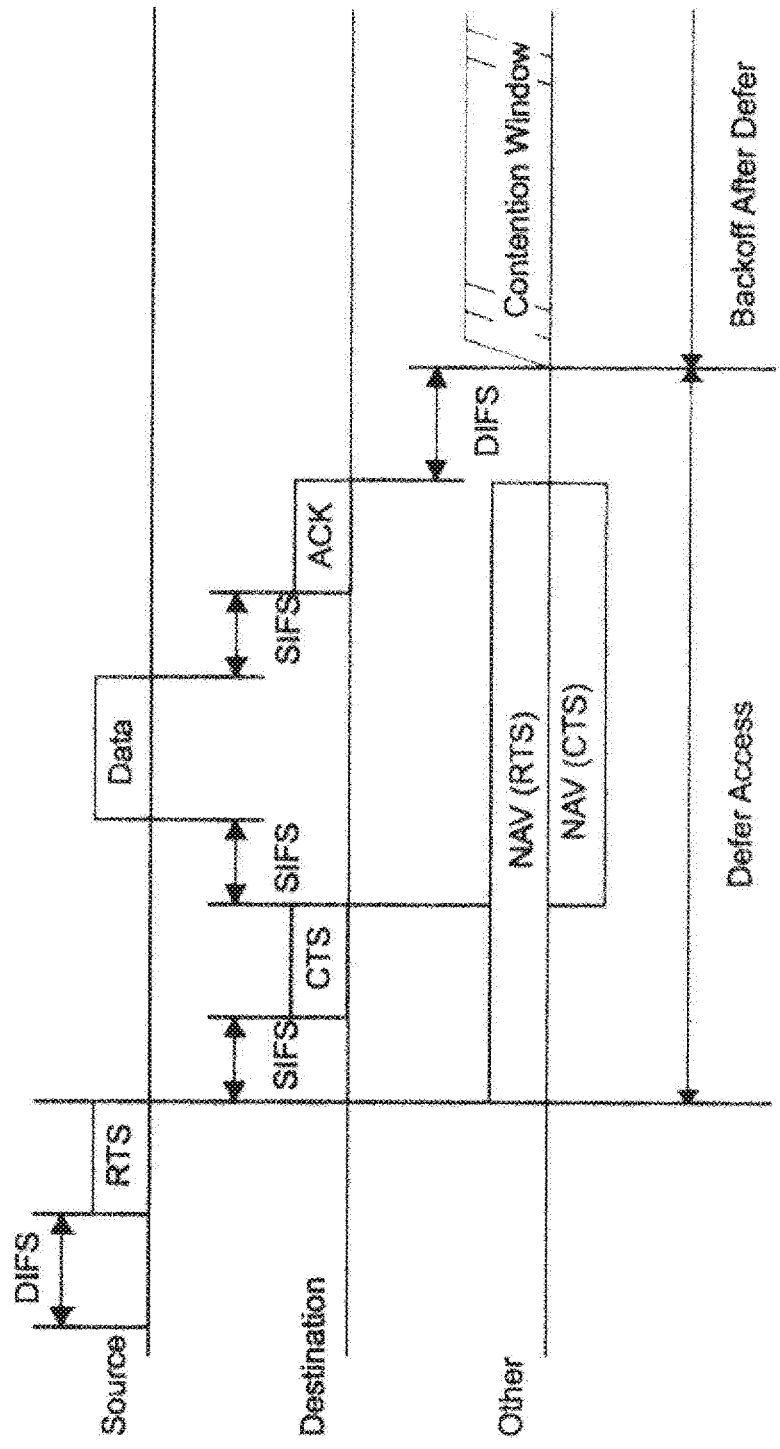
FIG. 21 illustrates an example of NAV setting.

FIG. 21 illustrates an example of NAV setting.

Referring to FIG. 21, a source STA transmits an RTS frame and a destination STA transmits CTS frame. As described above, the destination STA designated as a recipient through the RTS frame does not set a NAV. Some of other STAs may receive the RTS frame and set NAVs and others may receive the CTS frame and set NAVs.

If the CTS frame (e.g., PHY-RXSTART.indication primitive) is not received within a predetermined period from a timing when the RTS frame is received (e.g., PHY-RXEND.indication primitive for which MAC corresponds to the RTS frame is received), STAs which have set or updated NAVs through the RTS frame can reset the NAVs (e.g., 0). The predetermined period may be (2*aSIFSTime+ CTS_Time+aRxPHYStartDelay+2*aSlotTime). The CTS_Time may be calculated on the basis of the CTS frame length indicated by the RTS frame and a data rate.

Although FIG. 21 illustrates setting or update of a NAV through the RTS frame or CTS frame for convenience, NAV setting/resetting/update may be performed on the basis of duration fields of various frames, for example, non-HT PPDU, HT PPDU, VHT PPDU and HE PPDU (e.g., the duration field of the MAC header of the MAC frame). For example, if the RA field of the received MAC frame does not correspond to the address of an STA (e.g., MAC address), the STA may set/reset/update the NAV.

As described above, in an existing wireless LAN system (e.g., 11a/b/g/n/ac) previous to 11ax, an STA maintains a single NAV, and the NAV is configured through a duration field of a MAC header. Namely, each of a TXOP holder (e.g., Tx STA) and a TXOP responder (e.g., Rx STA) sends total TXOP information necessary for transmission/reception of frames in a manner that the total TXOP information is included in a duration field of a frame transceived between the TXOP holder and the TXOP responder. Third party STAs other than the TXOP holder or the TXOP responder check a duration field exchanged between the TXOP holder and the TXOP responder and defer a channel use until an NAV term by configuring/updating an NAV.

Meanwhile, in a currently discussed flax WLAN system, an STA can support a plurality of NAVs. For example, an flax STA can maintain a regular NAV and an intra BSS NAV. The regular NAV is configured to protect a transmission opportunity of PPDU that is not identified as an inter-BSS PPDU or an intra-BSS. The intra BSS is configured to protect a transmission opportunity for PPDU from a BSS to which an STA belongs.

TXOP Duration Field of HE-SIG A

In an 11ax system supportive of HE PPDU, third party STAs may be unable to obtain TXOP duration information (e.g., duration field) included in a MAC header of MPDU. Here, there is a problem that the third party STA has difficulty in performing NAV configuration/update correctly. To solve it, an HE STA can send TXOP duration information in a manner that the TXOP duration information is included in HE-SIG A.

Meanwhile, 15 bits (e.g., B0~B14) in a duration field of a MAC header can indicate duration information and about maximum 32.7 ms (0~32767 us) can be indicated with 1 us granularity.

If the 15-bit duration information included in the duration field of the MAC header is transmitted in a manner of being included in the HE-SIG A intactly, it causes a problem that signaling overhead of the HE-SIG A increases excessively. Although 15 bits can be regarded as a relatively small size in MPDU for payload transmission on a MAC layer, since HE-SIG A for common control information transmission on a physical layer is a field designed compact, the increase of 15 bites in the HE-SIG A corresponds to a relatively large signaling overhead.

Hence, in order to minimize an overhead of HE-SIG A, a TXOP duration of the HE-SIG A has a bit size smaller than that of a MAC duration field but is configured to have a larger time unit granularity.

For example, a TXOP duration of HE-SIG A is set to a 7-bit size and a granularity of a time unit may be 8 or 128 us. MSB (i.e., B0) in 7 bits may be used to indicate whether a time unit granularity is 8 or 128 us. Particularly, when B0=0, a TOXP duration value may be 8 us×(B1–B6). When B0=1, a TXOP duration value may be (512+128) us×(B1– B6).

A TXOP duration of HE-SIG A may be configured based on MAC duration. For example, a TXOP of HE-SIG A may include a maximum value configurable in a TXOP duration field of the HE-SIG A without exceeding the MAC duration.

NAV Update Method for HE PPDU

Although the existing NAV update is performed on the basis of a duration field of a MAC header, since a TXOP duration field of HE-SIG A is included as well as the duration field of the MAC header in case of HE PPDU, it is unclear to determine that an NAV update should be performed based on which field. Therefore, it is necessary to newly define an NAV update method for HE PPDU.

Proposal 1: Case of Updating NAV Using TXOP Duration of HE-SIG A

For one example, an STA having received HE PPDU can perform an NAV update using a TXOP duration of HE-SIG A.

For instance, if an STA receives HE PDU and a valid TXOP duration of HE-SIG A is greater than a current NAV value of the STA, the STA can perform an NAV update with the TXOP duration of the HE-SIG A.

Particularly, when an STA receives HE PDDU, if a valid TXOP duration of HE-SIG A is greater than a current NAV value of the STA and an RA (recipient address) of a received frame fails to match a MAC address of the STA, the STA can perform an NAV update with the TXOP duration of the HE-SIG A.

More particularly, when an STA receives HE PDDU, if a valid TXOP duration of HE-SIG A is greater than a current NAV value of the STA and a received fame is not intended for the STA, the STA can perform an NAV update with the TXOP duration of the HE-SIG A. If one of a case (i) that an RA of a received frame fails to meet a MAC address of the STA, a case (ii) that AID/PAID/address of the STA is not included in HE-SIG A/B of DL MU PPDU, and a case (iii) that BSS color information included in the HE-SIG A of the HE PPDU fails to match BSS color of AP/BSS associated with the corresponding STA, the STA can determine that the received frame is not a frame intended for the corresponding STA, by which the present invention is non-limited.

Proposal 2: Case of Updating NAV by Preferentially Considering MAC Duration of MAC Header For one example, an STA having received HE PPDU can perform an NAV update using a duration field (i.e., MAC duration) of a MAC header.

As described above, a MAC duration of a MAC header has a granularity greater than that of a TXOP duration of HE-SIG A. The MAC duration of the MAC header has a length of 15 bits and a granularity of a time unit is 1 us. On the contrary, the TXOP duration of the HE-SIG A has a length of 4~9 bits (e.g., 7 bits) and may support a time unit granularity equal to or greater than 16 us. For instance, the TXOP duration may be 8 or 128 us, by which the present invention is non-limited.

According to one embodiment of the present invention, if an STA obtains both a MAC duration of a MAC header included in HE PPDU and a TXOP duration of HE-SIG A (e.g., if both a PHY preamble and a header of a MAC frame are successfully decoded), the STA can prioritize the MAC duration rather than a TXOP duration field of an HE-SIG A field. Namely, in updating a NAV, the STA can consider the MAC duration more preferentially than the TXOP duration of the HE-SIG A field. For instance, updating an NAV based on a TXOP duration of an HE-SIG A field like the proposal 1 may be limited to a case that an STA fails to obtain a MAC duration.

The reason for prioritizing a MAC duration rather than a TXOP duration of HE-SIG A is described as follows. Namely, since a granularity of the MAC duration is finer than that of the TXOP duration of the HE-SIG A, a MAC duration value can indicate a real TXOP duration more accurately than a TXOP duration value of the HE-SIG A.

(1) Case of Performing an NAV Update According to MAC Duration

If an STA receives HE PDU and obtains a valid MAC duration, the STA ignores a TXOP duration of HE-SIG A and is able to perform an NAV update according to the valid MAC duration. Here, if the STA obtains the valid MAC duration, it may mean that the STA obtains the TXOP duration of the HE-SIG A. This is because the STA should succeed in decoding of a preamble of a PHY layer including the HE-SIG A in order to decode a MAC layer frame header.

A process for the STA to perform the NAV update according to the valid MAC duration may be performed similarly to the existing NAV update process. For instance, if a MAC duration of a received frame is greater than a current NAV value of the STA and an RA of the received frame fails to match a MAC address of the STA, the STA updates an NAV with the MAC duration. Meanwhile, in case that PSDU (physical layer service data unit) does not have an RA field, an NAV update can be performed like (i) or (ii). If one of a case (i) that AID/PAID/address is not included in HE-SIG A/B of DL MU PPDU and a case (ii) that BSS color information included in HE-SIG A of HE PPDU fails to match BSS color of AP/BSS associated with the corresponding STA is met, the STA updates the NAV.

The present example shows that the NAV is updated if the STA received an unintended PPDU, by which the present invention is non-limited. In some cases, in case of receiving an intended PPDU, the STA may update the NAV using Duration (e.g., a duration field included in a MAC header).

(2) Case of Performing NAV Update Using TXOP Duration

Moreover, when an STA receives HE PPDU, in case that a valid TXOP duration of HE-SIG A is greater than a current NAV value of the STA and that the STA fails to obtain a valid MAC duration of PSDU (i.e., MAC frame), if a received frame is not intended for the corresponding STA, the STA performs an NAV update using the TXOP duration of the HE-SIG A.

In case that the STA fails to obtain the valid MAC duration of the PSDU (i.e., MAC frame), it may correspond to the following cases for example, by which the present invention is non-limited. Such cases may include: (i) a case that the STA fails to decode all MPDUs included in PSDU due to errors; (ii) a case that an HE-SIG B field does not exist because a received PPDU is UL MU PPDU; (iii) a case that a MAC header does not include a MAC duration field (e.g., short MAC header); and (iv) a case that after the STA has decoded HE-SIG A of PPDU correctly, the STA enters a Doze/Sleep state for power saving for a duration of the corresponding PPDU.

If one of following cases, which include a case that an RA of a received frame fails to meet a MAC address of the STA, a case that AID/PAID/address of the STA is not included in HE-SIG A/B of DL MU PPDU, and a case that BSS color information included in HE-SIG A of HE PPDU does not match BSS color of AP/BSS associated with the corresponding STA, is met, the STA can determine that the frame is not intended for the corresponding STA, by which the present invention is non-limited.

Thus, depending on whether the STA obtains at least one valid frame from PSDU, the NAV update can be performed.

According to the present example, the NAV is updated if the STA receives an unintended PPDU, by which the present invention is non-limited. In some cases, the STA may update an NAV using a TXOP duration (e.g., a TXOP duration field included in HE-SIG A) in case of receiving an intended PPDU.

Meanwhile, in the aforementioned examples, only if a TXOP duration field is set to a valid value as duration information, the STA may be able to update an NAV using the TXOP duration field. For instance, a specific value (e.g., 127) in the TXOP duration field may be interpreted as invalid duration information. The specific value may include a value that the TXOP duration field is set to 1 all (e.g., binary 1111111).

Particularly, as a case that the STA fails to obtain duration information of a MAC header, if a TXOP duration value of an HE-SIG A field is not 127 and the TXOP duration value is greater than a current NAV value, the STA updates an NAV using the TXOP duration value. On the contrary, although the STA fails to obtain duration information of a MAC header, if a TXOP duration value of an HE-SIG A field is 127, the STA does not update an NAV.

(3) NAV Update of STA Maintaining Two NAVs

Meanwhile, the proposed items of (1) and (2) are applicable to a case that an STA maintains two NAVs (e.g., intra-BSS NAV, inter-BSS NAV). The intra-BSS NAV is an NAV updated by receiving a frame transmitted by an STA of an intra-BSS. The inter-BSS NAV is an NAV updated by receiving a frame transmitted by an STA of the inter-BSS, and is updated even if a frame (e.g., CTS), which is not identifiable as an intra-BSS PPDU or an inter-BSS PPDU, is received. The inter-BSS NAV may be referred to as a non-intra-BSS NAV, a regular NAV or a basic NAV.

(i) If an unintended STA accurately receives HE-SIG A of an intra-BSS HE PPDU (e.g., HE PPDU of which BSS color field included in HE-SIG A matches a color of BSS having the STA belong thereto) and fails to receive any one of a valid frame (i.e., MPDU) within PSDU of the corresponding HE PPDU, the unintended STA updates an intra-BSS NAV using a TXOP duration of the HE-SIG A. If the unintended STA receives at least one valid frame (i.e., MPDU) within a PSDU of a frame indicated as an inter-BSS frame, it updates an intra-BSS NAV using a duration field (i.e., MAC duration) in the frame. For instance, if a TA (transmitter address) or RA (receiver address) included in a MAC header of a PSDU matches a BSSID of an AP associated with the corresponding STA, it update an intra-BSS NAV with a MAC duration value. Although BSS color of HE-SIG A indicates an intra-BSS PPDU, if the TA or RA of the MAC header does not match the BSSID, the STA does not update the intra-BSS NAV with a value of the duration field. In this case, the STA ignores a TXOP duration field of HE-SIG A included in the corresponding HE PPDU.

(ii) If an unintended STA accurately receives HE-SIG A of an inter-BSS HE PPDU (e.g., HE PPDU of which BSS color field included in HE-SIG A fails to match a color of BSS having the STA belong thereto) and fails to receive any one of a valid frame (i.e., MPDU) within PSDU of the corresponding HE PPDU, the unintended STA updates an inter-BSS NAV using a TXOP duration of the HE-SIG A. If the unintended STA receives at least one valid frame (i.e., MPDU) within a PSDU of a frame indicated as an inter-BSS frame, it updates an intra-BSS NAV using a duration field (i.e., MAC duration) in the frame. In this case, the STA ignores a TXOP duration field of HE-SIG A included in the corresponding HE PPDU.

(4) Inter-BSS NAV Update Considering Spatial Reuse

Moreover, the NAV update methods proposed in (1)~(3) may be limitedly applicable only if a condition for spatial reuse is not met. For instance, only if a power of a received OBSS PPDU (e.g., inter-BSS PPDU) is not lower than an OBSS PD level configured for an STA, the STA can update an inter-BSS NAV by applying an NAV update rule. If the power of the received OBSS PPDU is lower than the OBSS PD level (i.e., if a spatial reuse condition is met), the STA does not update a current inter-BSS NAV of the STA with an NAV (e.g., TXOP duration/MAC duration) of the received frame despite that an NAV value of the received frame is greater than the current inter-BSS NAV configured for the STA.

OBSS PD level is schematically described as follows. First of all, in order to determine whether a frame detected by an STA is an inter-BSS frame or an intra-BSS frame, the STA can use BSS color information, MAC address information of a MAC header, etc. if the detected frame is determined as the inter-BSS fame, the STA can use an OBSS PD (packet detection) level in order to determine whether a medium is idle (i.e., CCS procedure). The OBSS PD level is set to a value greater than a CCA level (i.e., minimum receive sensitivity level) used for an intra-frame.

Namely, the STA determines whether the medium is busy with reference to a higher CCA level for another BSS (OBSS) frame in order to raise a spatial ruse rate, and is able to update an NAV. For instance, if an RSSI value of an OBSS frame is smaller than an OBSS PD level, the STA can determine that a channel is in idle state. ON the contrary, if a received frame is a frame (e.g., intra-BSS frame) within a BSS to which the STA belongs, the STA determines whether the medium is idle by applying a CCA level (e.g., minimum receive sensitivity level) of a lower level.

Thus, since a more flexible CCS determination reference applies to an OBSS frame, it become less probable that a medium is determined as busy depending on an OBSS frame reception. So to speak, although an OBSS frame is received, it becomes more probable that an STA can use a channel. Therefore, a use of an OBSS PD level enables a more efficient spatial reuse.

Proposal 3: Case of Updating NAV Using Higher Value Selected from MAC Duration and TXOP Duration According to another embodiment of the present inve3ntion, based on a greater value of a MAC duration of a MAC header and a TXOP duration of an HE-SIG A field, an STA may perform an NAV update.

When an STA receives HE PPDU and obtains valid MAC duration information, if a MAC duration is greater than a TXOP duration of HE-SIG A, the STA ignores the TXOP duration of the HE-SIG A and is able to perform an NAV update according to a valid MAC duration. Here, if the STA obtains the valid MAC duration, it may mean that the STA obtains the TXOP duration of the HE-SIG A. A process for the STA to perform the NAV update according to the valid MAC duration may be performed similarly to an existing NAV update process. For instance, if a MAC duration of a received frame is greater than a current NAV value and an RA of the received frame fails to match a MAC address of an STA, the STA updates an NAV with the MAC duration.

If an STA receives HE PPDU, if the STA obtains valid MAC duration information, if a TXOP duration of HE-SIG A is greater than a MAC duration, if a TXOP duration of the HE-SIG A is greater than a current NAV value of the STA, and if a received frame is not intended for the STA, the STA updates an NAV through the TXOP duration of the HE-SIG A. If one of a case (i) that an RA of a received frame fails to meet a MAC address of the STA, a case (ii) that AID/PAID/address of the STA is not included in HE-SIG A/B of DL MU PPDU, and a case (iii) that BSS color information included in the HE-SIG A of the HE PPDU fails to match BSS color of AP/BSS associated with the corresponding STA, the STA can determine that the received frame is not a frame intended for the corresponding STA, by which the present invention is non-limited.

Figure 22:
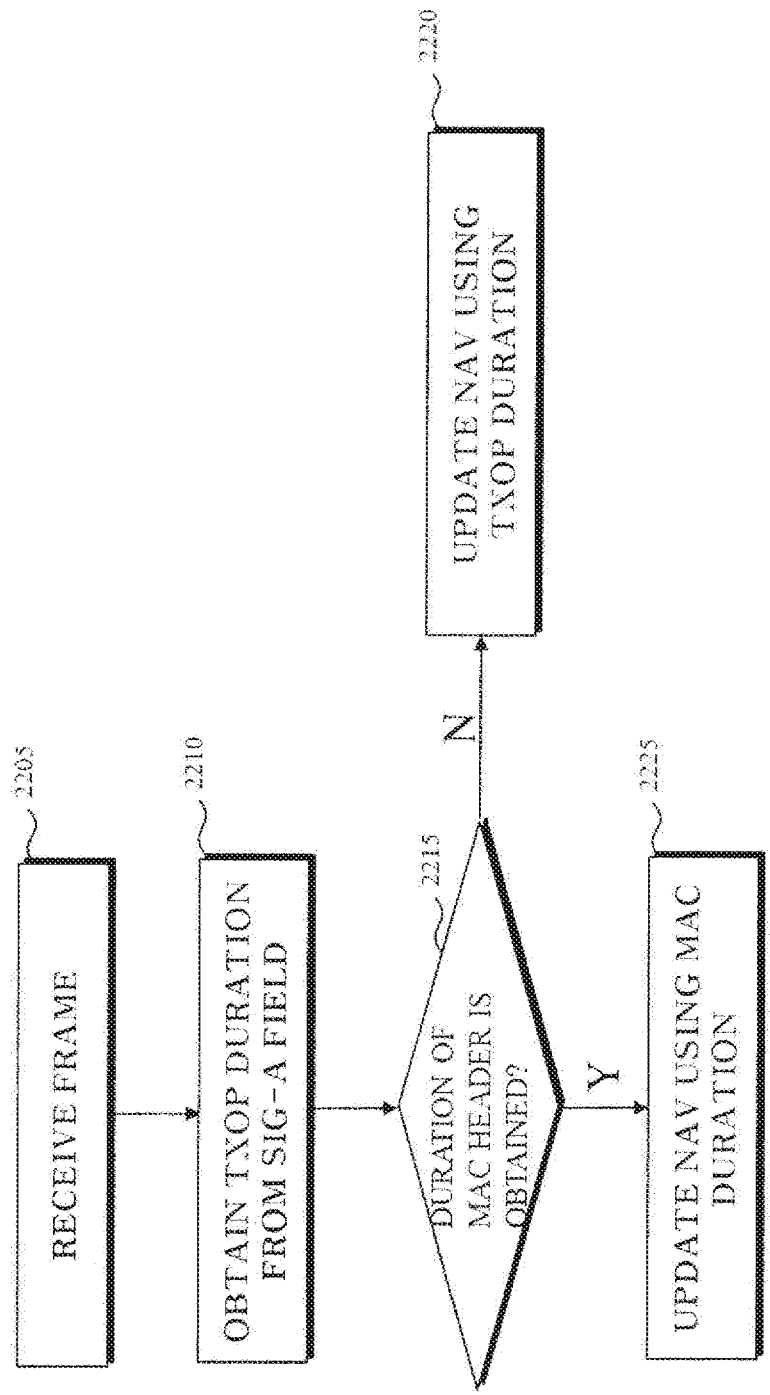
FIG. 22 and FIG. 23 are flowcharts of an NAV updating method according to one embodiment of the present invention.
Figure 23:
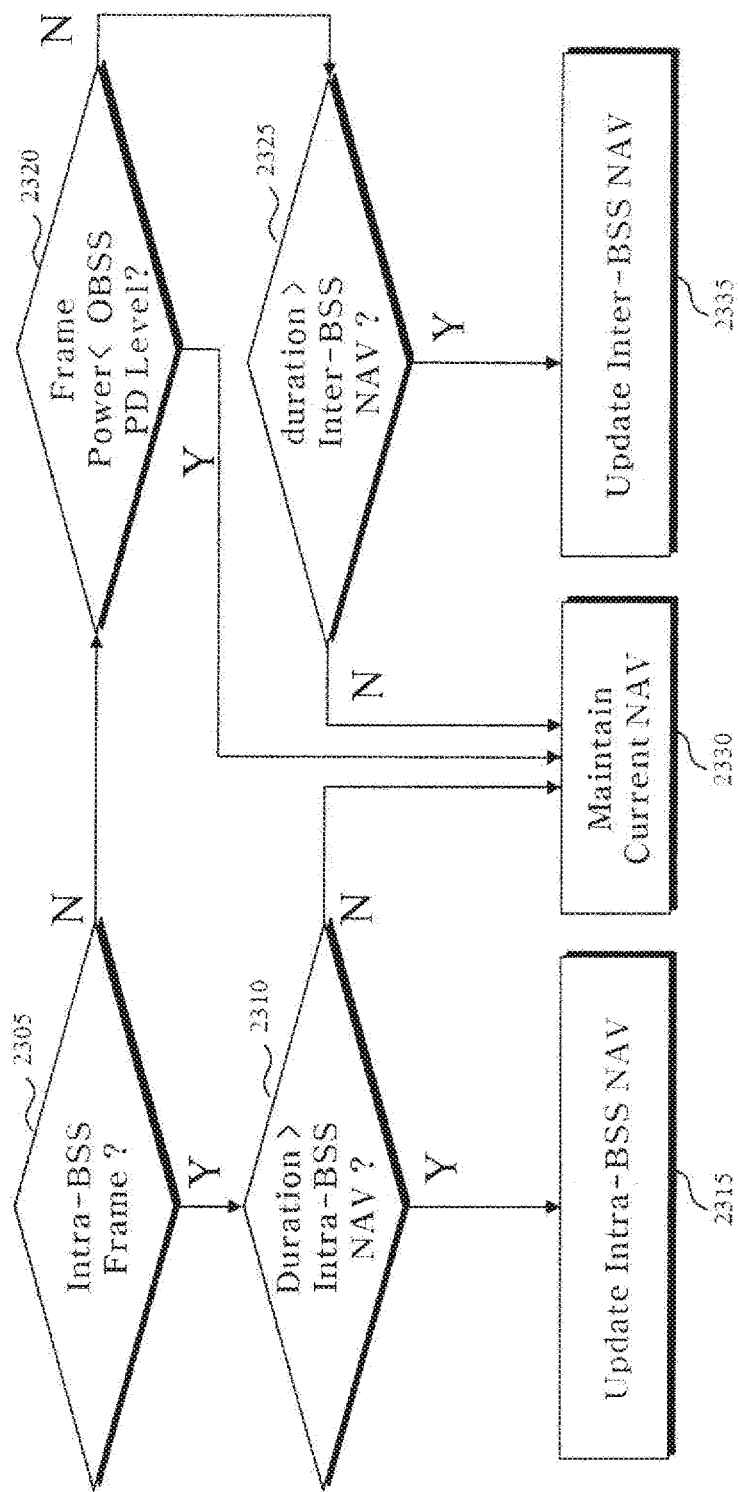

FIG. 22 and FIG. 23 are flowcharts of an NAV updating method according to one embodiment of the present invention. Substance redundant with the former description can be omitted. For clarity, assume that the process of FIG. 22 is performed by an STA, by which the present invention is non-limited. And, it is apparent to those skilled in the art that the same process can be performed by an AP.

First of all, referring to FIG. 22, an STA receives a frame [2205]. The frame may include HE PPDU. For instance, the received frame may include HE SU PPDU, HE MU PPDU or HE trigger-based PPDU, by which the present invention is non-limited. A physical layer preamble of the received frame may include a legacy preamble part (L-part) and an HE preamble part (HE-part). The HE-preamble may include at least one HE signal field. For instance, the HE-preamble may include an HE-SIG A field and/or an HE-SIG B field. Yet, the HE-SIG B field may be omitted depending on a type of the HE PPDU.

The frame may indicate a duration on each of a signal field (e.g., SIG-A) and a header of a MAC layer. For instance, the frame may indicate durations through a TXOP duration field of the HE-SIG A field and a duration field of the MAC header, respectively. Here, a duration (e.g., TXOP duration) indicated on the physical layer may have a granularity greater in a time unit than that of a duration (e.g., MAC duration) indicated on the MAC layer. Particularly, the TXOP duration may have granularity of 8 or 128 us, and the MAC duration may have granularity of 1 us.

The STA obtains the TXOP duration from the SIG-A field of the received frame [2210]. For instance, the STA attempts decoding of the received frame, thereby obtaining the TXOP duration from the SIG-A field.

As a result of the decoding attempt, if the STA obtains the MAC duration included in the MAC header as well as the TXOP duration, the STA ignores the TXOP duration and performs an NAV update using the MAC duration [2225]. On the other hand, if the STA fails to obtain the MAC duration included in the MAC header, the STA performs the NAV update using the TXOP duration [2220]. The case of failing to obtain the MAC duration may include one of a case that the STA fails in decoding on all MPDUs (MAC protocol data units) included in the frame, a case that the received frame is an uplink frame, a case that the header of the MAC layer is a short MAC header type, and a case that the STA makes transition to a doze mode for power saving after decoding the signal field, by which the present invention is non-limited.

Moreover, the NAV update 2220/2250 may be performed if the frame is not intended for the STA. For instance, if an RA (recipient address) of the frame mismatches a MAC address of the STA, if AID/PAID (association identifier/PAID) of the STA is not included in the signal field, or if BSS (basic service set) color included in the signal field mismatches a color of a BSS to which the STA belongs, the STA can determine that the frame is not intended for the STA.

With reference to FIG. 23, an NAV update process is described in detail. And, the following is apparent to those skilled in the art. First of all, if the process of FIG. 23 applies to the NAV update step 2220, a value used as a duration is a TXOP duration. Or, if the process of FIG. 23 applies to the NAV update step 2225, a value used as a duration is a MAC duration.

When an STA updates an NAV, the STA selects one of a plurality of NAVs maintained by the STA depending on whether a frame is received from a BSS (basic service set) to which the STA belongs and is then able to update the selected NAV. Here, a plurality of the NAVs may include an intra-BSS NAV and an inter-BSS NAV.

First of all, an STA determines whether a received frame is an intra-BSS frame [2305]. If the received frame is the intra-BSS frame and a duration of the frame is greater than an intra-BSS NAV value, the STA updates the intra-BSS NAV with the corresponding duration [2315]. On the contrary, if the duration of the frame is equal to or smaller than the intra-BSS NAV value, the STA maintain a current intra-BSS NAV value intactly.

If the frame is an OBSS (overlapping BSS) frame, the STA determines whether a power of the frame is smaller than an OBSS PD (packet detection) level [2320]. The OBSS PD level is provided for spatial reuse and may have a value greater than a CCA (clear channel assessment) threshold applied to the intra-BSS frame.

If the power of the frame is smaller than the OBSS PD level, the STA maintains a current inter-BSS NAV value [2330]. For instance, although the duration of the frame exceeds a value of the inter-BSS NAV, the update of the inter-BSS NAV is not performed.

If the power of the frame exceeds the OBSS PD level and the duration of the frame exceeds the inter-BSS NAV value, the STA updates the inter-BSS NAV value with the duration of the frame [2335].

Despite that the power of the frame exceeds the OBSS PD level, if the duration of the frame is equal to or smaller than the inter-BSS NAV value, the STA maintains the current inter-BSS NAV value intactly [2330].

Figure 24:
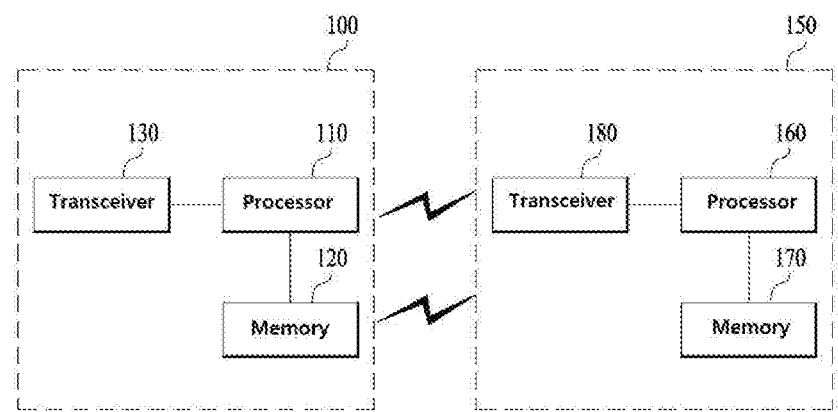
FIG. 24 is a diagram to describe an apparatus according to one embodiment of the present invention.

FIG. 24 illustrates devices for implementing the aforementioned methods.

A wireless device 100 and a wireless device 150 in FIG. 24 may correspond to the aforementioned specific STA and AP, respectively.

The STA 100 may include a processor 110, a memory 120, and a transceiver 130 and the AP 150 may include a processor 160, a memory 170, and a transceiver 160. The transceivers 130 and 180 may transmit/receive a wireless signal and may be implemented in a physical layer of IEEE 802.11/3GPP. The processors 110 and 160 are implemented in a physical layer and/or a MAC layer and are connected to the transceivers 130 and 180. The processors 110 and 160 may perform the above-described UL MU scheduling procedure.

The processors 110 and 160 and/or the transceivers 130 and 180 may include an Application-Specific Integrated Circuit (ASIC), a chipset, a logical circuit, and/or a data processor. The memories 120 and 170 may include a Read-Only Memory (ROM), a Random Access Memory (RAM), a flash memory, a memory card, a storage medium, and/or a storage unit. If an example is performed by software, the above-described method may be executed in the form of a module (e.g., a process or a function) performing the above-described function. The module may be stored in the memories 120 and 170 and executed by the processors 110 and 160. The memories 120 and 170 may be located at the interior or exterior of the processors 110 and 160 and may be connected to the processors 110 and 160 via known means.

The detailed description of the preferred examples of the present invention has been given to enable those skilled in the art to implement and practice the invention. Although the invention has been described with reference to the preferred examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

INDUSTRIAL APPLICABILITY

The present invention has been described on the assumption that the present invention is applied to a wireless LAN system supporting HE PPDUs. However, the present invention is not limited thereto and can be applied to various wireless communication systems including IEEE 802.11.

What is claimed is:

1. A method of updating a network allocation vector (NAV) by a station (STA) in a wireless local area network (LAN) system, the method comprising:
receiving a frame; and
updating the NAV of the STA when duration information is greater than a NAV value of the STA, wherein the duration information is included in a first field and a second field,
wherein the duration information included in the first field has a greater granularity of a time unit than that of the duration information included in the second field,
wherein the NAV is updated with the duration information of the first field having the greater granularity when the duration information is not obtained from the second field, and wherein if the frame is an overlapping basic service set (OBSS) frame and a power of the frame is smaller than an OBSS packet detection (PD) level, an update of the inter-BSS NAV is not performed even if the duration information of the frame exceeds a value of the inter-BSS NAV.

2. The method of claim 1, the first field is included in a signal (SIG) field of a physical layer, and the second field is included in a Medium Access Control (MAC) header of a MAC layer.

3. The method of claim 1, wherein when the duration information included in the second field is obtainable, the duration information included in the first field is ignored in the update of the NAV.

4. The method of claim 1, wherein the NAV is updated with duration information included in the first field when the duration information included in the second field is obtainable.

5. The method of claim 2, wherein the case where the STA does not obtain the duration information included in the second field corresponds to a case where the STA fails to decode all MAC protocol data units (MPDUs) included in the frame, a case where the received frame is an uplink frame, a case where the header of the MAC layer is a short MAC header type, or a case where the STA makes transition to a doze mode for power saving after decoding the signal (SIG) field.

6. The method of claim 1, wherein in updating the NAV, the STA selects and updates one of a plurality of NAVs maintained by the STA depending on whether the frame is received from a basic service set (BSS) where the STA belongs, and
wherein the plurality of NAVs include an intra-BSS NAV and an inter-BSS NAV.

7. The method of claim 1, wherein the OBSS PD level is for a spatial reuse and has a value greater than a clear channel assessment (CCA) threshold applied to an intra-BSS frame.

8. The method of claim 1, wherein the NAV update is performed when the frame is not intended to the STA.

9. The method of claim 2, wherein the STA determines that the frame is not intended to the STA if a recipient address (RA) of the frame is not identical to a MAC address of the STA, if an association identifier (AID) of the STA is not included in the SIG field, or if a basic service set (BSS) color included in the SIG field is not identical to a color of a BSS where the STA belongs.

10. A station (STA) updating a network allocation vector (NAV) in a wireless local area network (LAN) system, the STSA comprising:
a receiver for receiving a frame; and
a processor for updating the NAV of the STA when duration information's greater than a NAV value of the STA,
wherein the duration information is included each of a s first field and a second field,
wherein the duration information included in the first field has a greater granularity of a time unit than that of the duration information included in the second field, and
wherein the NAV is updated with the duration information of the first field having the greater granularity when the duration information is not obtained from the second field, and
wherein if the frame is an overlapping bask service set (OBSS) frame and a power of the frame is smaller than an OBSS packet detection (PD) level, an update of the inter-BSS NAV is not performed even if the duration information Halite frame exceeds a value of the inter-BSS NAV.

11. The STA of claim 10, the first field is included in a signal (SIG) field of a physical layer, and the second field is included in a Medium Access Control (MAC) header a MAC layer.

12. The STA of claim 10, wherein when the duration information included in the second field is obtainable, the duration information included in the first field is ignored in the update of the NAV.

13. The STA of claim 10, wherein the NAV is updated with duration information included in the first field when the duration information included in the second field is obtainable.

14. The STA of claim 11, wherein the case where the processor does not obtain the duration information included in the second field corresponds to a case where the STA fails to decode all MAC protocol data units (MPDUs) included in the frame, a case where the received frame is an uplink frame, a case where the header of the MAC layer is a short MAC header type, or a case where the STA makes transition to a doze mode for power saving after decoding the SIG field.

15. The STA of claim 10, wherein in updating the NAV, the STA selects and updates one of a plurality of NAVs maintained by the STA depending on whether the frame is received from a basic service set (BSS) where the STA belongs, and
wherein the plurality of NAVs include an intra-BSS NAV and an inter-BSS NAV.

16. The STA of claim 10, wherein the OBSS PD level is for a spatial reuse and has a value greater than a clear channel assessment (CCA) threshold applied to an intra-BSS frame.

17. The STA of claim 11,
wherein the NAV update is performed when the frame is not intended to the STA and
wherein the processor determines that the frame is not intended to the STA if a recipient address (RA) of the frame is not identical to a MAC address of the STA, if an association identifier (AID) of the STA is not included in the SIG field, or if a basic service set (BSS) color included in the SIG field is not identical to a color of a BSS where the STA belongs.

* * * * *